United States Patent
Nakayama et al.

[11] Patent Number: 5,277,673
[45] Date of Patent: Jan. 11, 1994

[54] CLUTCH-SEPARABLE PLANETARY GEAR TRANSMISSION

[75] Inventors: Hiroshi Nakayama; Takashi Hotta; Yukio Morita; Yoichi Kojima; Kimihiko Kikuchi; Tsunefumi Niiyama; Yorinori Kumagai; Shinichi Sakaguchi, all of Saitama; Tomoharu Kumagai, Tokyo, all of Japan

[73] Assignee: Honda Giken Kogyo Kabushiki Kaisha, Tokyo, Japan

[21] Appl. No.: 757,056

[22] Filed: Sep. 9, 1991

[51] Int. Cl.⁵ .............................. F16H 3/62
[52] U.S. Cl. .................... 475/278; 475/276
[58] Field of Search ............ 475/276, 277, 278

[56] References Cited

U.S. PATENT DOCUMENTS 5,071,398 12/1991 Hotta et al. ............ 475/276

FOREIGN PATENT DOCUMENTS

| | | | |
|---|---|---|---|
| 59-222644 | 12/1984 | Japan . | |
| 61-103654 | 7/1986 | Japan . | |
| 63-318349 | 12/1988 | Japan . | |
| 1-320362 | 12/1989 | Japan . | |
| 2-154839 | 6/1990 | Japan | 475/278 |
| 2-154842 | 6/1990 | Japan | 475/278 |
| 2-236042 | 9/1990 | Japan | 475/278 |

OTHER PUBLICATIONS

English translation of Abstract of JP Nos. 63-318349, 59-222644 and 1-320362.

*Primary Examiner*—Leslie A. Braun
*Assistant Examiner*—Benjamin Levi
*Attorney, Agent, or Firm*—Lyon & Lyon

[57] ABSTRACT

A planetary gear transmission typically for use on automobiles has first, second, and third planetary gear trains arranged coaxially with each other and each having elements including a sun gear, a carrier, and a ring gear. Two of the elements of each of the first, second, and third planetary gear trains are directly or disengageably coupled to elements of the other planetary gear trains between input and output members. The elements of the first, second, and third planetary gear trains are corotatably coupled into first, second, third, fourth, and fifth rotational members the first, second, and fifth rotational members being coupled to the input member, the fourth rotational member being coupled to the output member. The planetary gear transmission also has a separating clutch disposed between the elements of the second rotational member, for disengageably connecting the elements of the second rotational member.

6 Claims, 16 Drawing Sheets

| RANGES | K 1 | K 2 | K 3 | B 1 | B 2 | B 3 | RATIOS |
|--------|-----|-----|-----|-----|-----|-----|--------|
| LOW    |     |     |     | O   | (O) |     | 3.500  |
| 2ND    |     |     | O   |     | O   |     | 1.937  |
| 3RD    |     |     | O   |     |     | O   | 1.300  |
| 4TH    |     | O   | O   |     |     |     | 1.000  |
| 5TH    |     | O   |     |     |     | O   | 0.680  |
| REV    | O   |     |     |     | O   |     | -2.125 |

| PLANETARY GEAR TRAINS | | ROTATIONAL MEMBERS | | | | | $\lambda$ |
|---|---|---|---|---|---|---|---|
| | | 1ST | 2ND | 3RD | 4TH | 5TH | |
| | G1 | | | R1 | C1 | S1 | 0.40 |
| | G2 | S2 | C2 | | R2 | | 0.47 |
| | G3 | | S3 | C3 | R3 | | 0.60 |

| RANGES | K1 | K2 | K3 | B1 | B2 | B3 | RATIOS |
|---|---|---|---|---|---|---|---|
| LOW  |   |   |   | O | (O) |   | 3.500 |
| 2ND  |   |   | O |   | O |   | 1.937 |
| 3RD  |   |   | O |   |   | O | 1.300 |
| 4TH  |   | O | O |   |   |   | 1.000 |
| 5TH  |   | O |   |   |   | O | 0.680 |
| REV  | O |   |   |   | O |   | -2.125 |

| | | ROTATIONAL MEMBERS | | | | | λ |
|---|---|---|---|---|---|---|---|
| | | 1ST | 2ND | 3RD | 4TH | 5TH | |
| PLANETARY GEAR TRAINS | G2 | S2 | C2 | | R2 | | 0.47 |
| | G3 | | S3 | C3 | R3 | | 0.60 |
| | G1 | | R1 | C1 | | S1 | 0.48 |

| RANGES | K1 | K2 | K3 | B1 | B2 | B3 | RATIOS |
|---|---|---|---|---|---|---|---|
| LOW |  |  |  | O | (O) |  | 3.500 |
| 2ND |  |  | O |  | O |  | 1.937 |
| 3RD |  |  | O |  |  | O | 1.300 |
| 4TH |  | O | O |  |  |  | 1.000 |
| 5TH |  | O |  |  |  | O | 0.680 |
| REV | O |  |  |  | O |  | -2.125 |

| PLANETARY GEAR TRAINS | | ROTATIONAL MEMBERS | | | | | $\lambda$ |
|---|---|---|---|---|---|---|---|
| | | 1ST | 2ND | 3RD | 4TH | 5TH | |
| | G1 | | | C1 | R1 | $S_s$ | 0.286 |
| | G3 | | $S_L$ | C1 | R1 | | 0.600 |
| | G2 | S2 | C2 | | R2 | | 0.471 |

| RANGES | K1 | K2 | K3 | B1 | B2 | B3 | RATIOS |
|--------|----|----|----|----|----|----|--------|
| LOW    |    |    |    | O  | (O)|    | 3.500  |
| 2ND    |    |    | O  |    | O  |    | 1.937  |
| 3RD    |    |    | O  |    |    | O  | 1.300  |
| 4TH    |    | O  | O  |    |    |    | 1.000  |
| 5TH    |    | O  |    |    |    | O  | 0.680  |
| REV    | O  |    |    |    | O  |    | -2.125 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | | | R1 | C1 | S$_L$ | 0.400 |
| | G3 | | S$_s$ | R1 | C1 | | 0.375 |
| | G2 | S2 | C2 | | R2 | | 0.471 |

| RANGES | K1 | K2 | K3 | B1 | B2 | B3 | RATIOS |
|---|---|---|---|---|---|---|---|
| LOW |  |  |  | O | (O) |  | 3.625 |
| 2ND |  |  | O |  | O |  | 2.125 |
| 3RD |  |  | O |  |  | O | 1.321 |
| 4TH |  | O | O |  |  |  | 1.000 |
| 5TH |  | O |  |  |  | O | 0.714 |
| REV | O |  |  |  | O |  | -2.500 |

| PLANETARY GEAR TRAINS | | ROTATIONAL MEMBERS | | | | | λ |
|---|---|---|---|---|---|---|---|
| | | 1ST | 2ND | 3RD | 4TH | 5TH | |
| | G1 | | | R1 | C1 | S1 | 0.381 |
| | G2 | S2 | C2 | | R2 | | 0.400 |
| | G3 | | S3 | R3 | C3 | | 0.429 |

CLUTCH-SEPARABLE PLANETARY GEAR TRANSMISSION

BACKGROUND OF THE INVENTION

1. Field of the Invention

The present invention relates to a planetary gear transmission which comprises three planetary gear trains.

2. Description of the Prior Art

Planetary gear transmissions are widely used as automatic transmissions for automobiles or the like. Many conventional planetary gear transmissions comprise two planetary gears such as Ravigneaux gear trains, Simpson gear trains, or the like, which are combined with each other, and generally have gear positions up to a fourth forward gear position. To meet demands for more gear positions for improved running characteristics, there have been proposed transmissions having gear positions up to and more than a fifth forward gear position, and some of those proposed transmissions have already been in use.

Transmissions with an increased number of gear positions are disclosed in Japanese Laid-Open Patent Publication No. 63-318349 and Japanese Laid-Open Utility Model Publication No. 61-103654, for example. The disclosed transmissions comprise two planetary gear trains each combined with three clutches and three brakes, and have six forward gear positions and one reverse gear position. Since only two planetary gear trains are employed, the disclosed transmissions may share components with conventional planetary gear transmissions. However, the disclosed transmissions are complex in transmission control because they cannot avoid gearshifts which require two engaging means (a clutch and a brake) to be disengaged and two other engaging means to be engaged at the same time.

For example, when the disclosed transmissions effect a gearshift from the second gear position to the third gear position or a gearshift from the third gear position to the second gear position, it is necessary for the transmission to disengage one clutch and one brake and also to engage another clutch and another brake.

Japanese Laid-Open Patent Publications Nos. 59-222644 and 1-320362, for example, disclose planetary gear transmissions each having three planetary gear trains. In the disclosed planetary gear transmissions, two elements of each planetary gear train are mechanically coupled to elements of the other planetary gear trains, and four clutches and three brakes are combined with the planetary gear trains. The disclosed planetary gear transmissions have five forward gear positions and one reverse gear position which can be selected by controlling the operation of the engaging means (i.e., the clutches and the brakes). More specifically, any gearshifts between adjacent ones of the five forward gear positions can be accomplished by disengaging one engaging means (a clutch or a brake) and engaging another engaging means. Therefore, controlling the disclosed planetary gear transmissions is relatively simple.

The above planetary gear transmissions with three planetary gear trains are, however, problematic in that in certain gear ranges (e.g., a LOW (1ST) range, a 5TH range, a REV range, or the like), either one of the elements (i.e., a sun gear, a carrier, and a ring gear) of the planetary gear trains rotates at a speed considerably higher than the speed of rotation of the engine (i.e., the input shaft), i.e., rotates at excessive speed. Consequently, the planetary gear transmissions may not be combined with engines that rotate at high speed, although they are suitable for use with engines that rotate at low speed, such as diesel engines.

Transmissions with five gear positions are often required to have a wider range of speed reduction ratios from the first gear position (LOW) to the fifth gear position for better running performance than transmissions with four gear positions. The wider range of speed reduction ratios is also conducive to the rotation of either planetary gear train element at excessive speed.

SUMMARY OF THE INVENTION

It is an object of the present invention to provide a planetary gear transmission with three planetary gear trains which is capable of establishing an increased number of gear positions.

Another object of the present invention is to provide a planetary gear transmission which can easily control gearshifts.

Still another object of the present invention is to provide a planetary gear transmission which comprises planetary gear trains, either one of the elements of the planetary gear trains being free of the problem of rotation at excessive speed.

According to the present invention, the above objects can be achieved by a planetary gear transmission comprising an input member, an output member, first, second, and third planetary gear trains arranged coaxially with each other and having elements including a sun gear, a carrier, and a ring gear, two of the elements of each of the first, second, and third planetary gear trains being directly or disengageably coupled to elements of the other planetary gear trains between the input and output members, the elements of the first, second, and third planetary gear trains being corotatably coupled into first, second, third, fourth, and fifth rotational members in a speed diagram, the first, second, and fifth rotational members being coupled to the input member, the fourth rotational member being coupled to the output member, and a separating clutch disposed between the elements of the second rotational member, for disengageably connecting the elements of the second rotational member.

In gear ranges that are established by those elements which tend to rotate at excessive speed, the separating clutch is disengaged to separate those elements which constitute the second rotational member, thereby preventing the elements from rotating at excessive speed.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figures 1, 2:
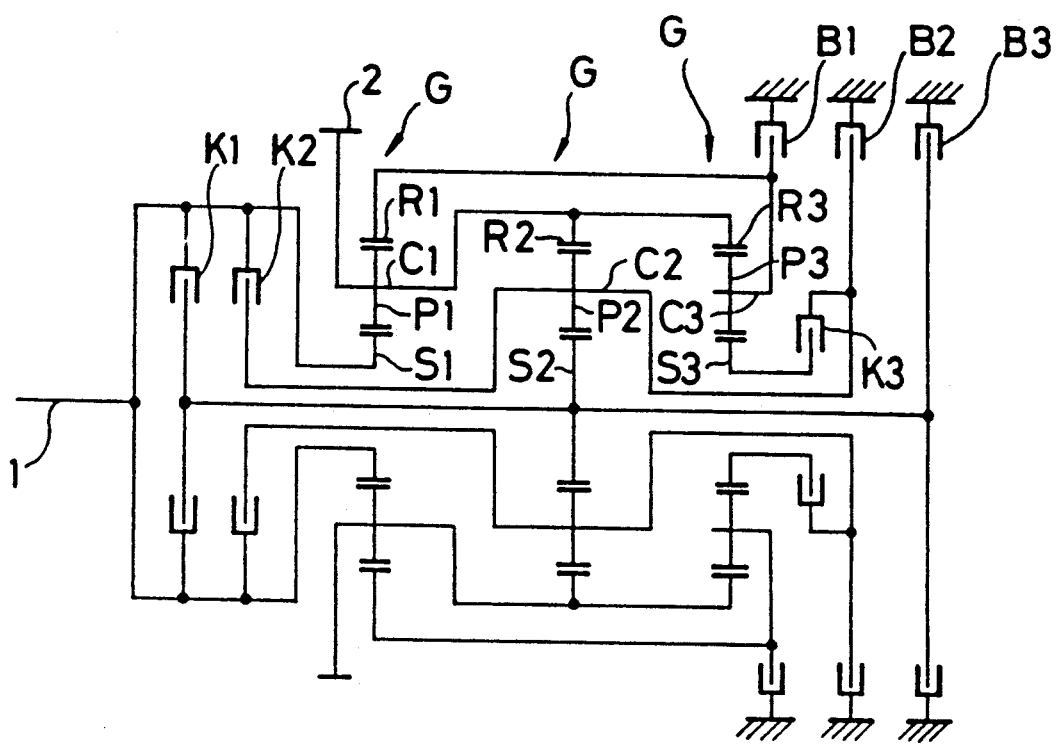
FIG. 1 is a diagram showing a skeleton of a planetary gear transmission according to a first embodiment of the present invention.
FIG. 2 is a table showing the relationship between gear ranges, engagement of clutches and brakes, and speed reduction ratios of the planetary gear transmission shown in FIG. 1.

Like or corresponding reference characters denote like or corresponding parts throughout the views.

1st Embodiment:

FIG. 1 shows a skeleton of a planetary gear transmission according to a first embodiment of the present invention. The planetary gear transmission has first, second, and third planetary gear trains G1, G2, G3 which are coaxially arranged parallel to each other. The first, second, and third planetary gear trains G1, G2, G3 have respective first, second, and third sun gears S1, S2, S3 which are positioned centrally, respective first, second, and third planetary pinions P1, P2, P3 held in mesh with the first, second, and third sun gears S1, S2, S3, respectively, and rotatable therearound while rotating about their own axes, respective first, second, and third carriers C1, C2, C3 on which the respective first, second, and third planetary pinions P1, P2, P3 are rotatably supported and which are rotatable therewith around the first, second, and third sun gears S1, S2, S3, respectively, and respective first, second, and third ring gears R1, R2, R3 comprising internal gears meshing with the respective first, second, and third planetary pinions P1, P2, P3.

The first sun gear S1 is securely connected to an input shaft 1 for rotation therewith at all times, and the first carrier C1 is connected to the second ring gear R2, the third ring gear R3, and an output gear 2. The first ring gear R1 can be held against rotation by a first brake B1. The first ring gear R1 and the third carrier C3 are connected to each other. The second sun gear S2 is disengageably connected to the input shaft 1 through a first clutch K1. The second sun gear S2 can be held against rotation by a third brake B3. The second carrier C2 is disengageably connected to the input shaft 1 through a second clutch K2. The second carrier C2 can be held against rotation by a second brake B2. The second carrier C2 is disengageably connected to the third sun gear S3 through a third clutch K3.

In the planetary gear transmission of the above structure, gear positions can be established and gearshifts can be controlled by controlling engagement and disengagement of the first, second, and third clutches K1, K2, K3 and the first, second, and third brakes B1, B2, B3. More specifically, five forward gear positions or ranges (LOW, 2ND, 3RD, 4TH, and 5TH) and one reverse gear position (REV) can be established by engaging and disengaging the first, second, and third clutches K1, K2, K3 and the first, second, and third brakes B1, B2, B3, as shown in FIG. 2. The symbol O in FIG. 2 indicates that the corresponding clutch or brake is engaged. The second brake B2 in the LOW range is indicated by the symbol (O) because it is engaged but is not involved in the transfer of the drive power. Speed reduction ratios in the respective gear ranges vary depending on the number of teeth of each of the gears, but are shown by way of illustrative example in FIG. 2.

The table of FIG. 2 shows that each of the five forward gear positions or ranges (LOW~5TH) can be established by engaging two of the clutches and brakes (which will also be referred to as "engaging means"). Any gearshifts between adjacent gear ranges can be achieved by disengaging one of the two engaging means and engaging the other engaging means, but not disengaging or engaging the two engaging means simultaneously. Therefore, the gearshifts can easily be controlled.

Figures 3, 5:
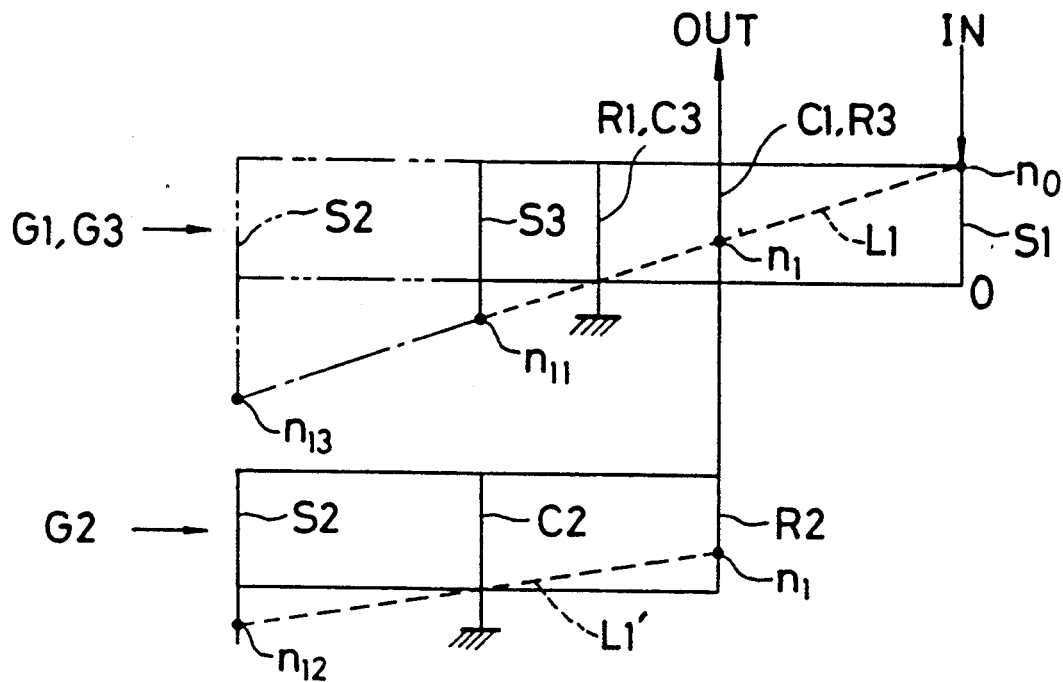
FIG. 3 is a table showing how elements are coupled into rotational members in the planetary gear transmission shown in FIG. 1.
FIGS. 4 through 7 are diagrams showing rotational speeds of elements of the planetary gear transmission shown in FIG. 1.

FIG. 3 shows how the elements (the sun gears, the carriers, and the ring gears) of the planetary gear transmission shown in FIG. 1 are coupled into rotational members. The second sun gear S2 singly serves as a first rotational member, and the second carrier C2 and the third sun gear S3 are coupled to each other and jointly serve as a second rotational member. The first ring gear R1 and the third carrier C3 are coupled to each other and jointly serve as a third rotational member. The first carrier C1, the second ring gear R2, and the third ring gear R3 are coupled to each other and jointly serve as a fourth rotational member. The first sun gear S1 singly serves as a fifth rotational member. As shown in FIG. 1, the third clutch K3 is disposed between the second carrier C2 and the third sun gear S3 which jointly serve as the second rotational member. Therefore, the second carrier C2 and the third sun gear S3 can be connected to and disconnected from each other by the third clutch K3.

FIG. 3 also illustrates ratios $\lambda$ between the number Zs of teeth of the sun gears and the number Zr of teeth of ring gears ($\lambda = Zs/Zr$).

Figure 4:
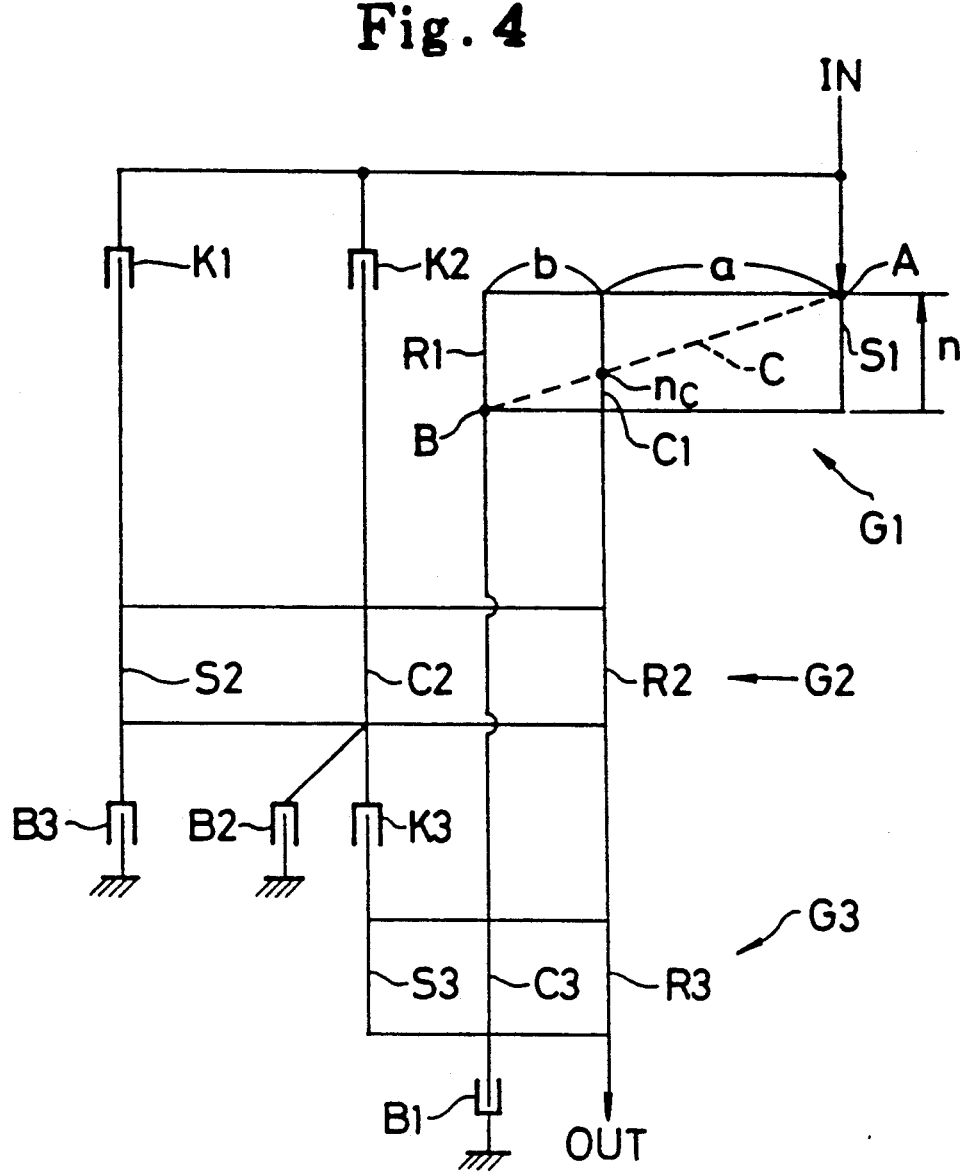

The relationship between rotational speeds of the elements of the planetary gear transmission according to the first embodiment is shown in FIG. 4. The speed reduction ratios in the respective gear ranges will be described below with reference to FIG. 4.

In FIG. 4, the first, second, and third planetary gear trains G1, G2, G3 are plotted separately from each other. In each of the plotted planetary gear trains G1, G2, G3, each vertical line represents one element of the planetary gear train, and the length thereof represents the rotational speed of the element. The distances between the vertical lines are proportional to the reciprocal of the number of teeth of the sun gears and the reciprocal of the number of teeth of the ring gears.

For example, the three vertical lines (FIG. 4) of the first planetary gear train G1 correspond, successively from the right to the left, to the first sun gear S1, the first carrier C1, and the first ring gear R1, respectively. The upward length of each of the vertical lines represents the rotational speed n in the forward direction. The distance "a" between the vertical line indicating the first sun gear S1 and the vertical line indicating the first carrier C1 corresponds to the reciprocal (1/Zs) of the number Zs of teeth of the first sun gear S1. The distance "b" between the vertical line indicating the first carrier C1 and the vertical line indicating the first ring gear R1 corresponds to the reciprocal (1/Zr) of the number Zr of teeth of the first ring gear R1. Therefore, when the first sun gear S1, connected to the input shaft 1, rotates at the speed n and the first ring gear R1 is held against rotation by the first brake B1, the rotational speed of the first carrier C1 is indicated by nc (FIG. 4) indicated by a point of intersection between the vertical line corresponding to the first carrier C1 and a line C which interconnects points A, B, the point A representing the rotation of the first sun gear S1 at the speed n and the point B representing the braked condition of the first ring gear R1.

The second and third planetary gear trains G2, G3 are defined basically in the same manner as described above. The first, second, and third clutches K1, K2, K3 and the first, second, and third brakes B1, B2, B3 are shown as corresponding to the elements with which they are associated.

The ratio of the rotational speed of the output gear 2 to the rotational speed of the input shaft 1, i.e., a speed reduction ratio, in each of the gear ranges will be determined using a speed diagram.

In the LOW range (gear position), all the clutches K1, K2, K3 and the third brake B3 are disengaged, and the first and second brakes B1, B2 are engaged. Since the first carrier C1 and the third ring gear R3 (two elements) are mechanically coupled to each other, and the first ring gear R1 and the third carrier C3 (two elements) are mechanically coupled to each other, the first and third planetary gear trains G1, G3 are integrally coupled to each other as a unitary planetary gear train, and may be plotted together as shown in FIG. 5. Because the third clutch K3 is disengaged, the second planetary gear train G2 is separate from the first and third planetary gear trains G1, G3, with only one element (i.e., the second ring gear R2) of the second planetary gear train G2 being coupled to the first and third planetary gear trains G1, G3. Consequently, the third clutch K3 functions as a separating clutch.

If the input shaft 1 rotates at a speed $n_0$, then the first sun gear S1 coupled to the input shaft 1 also rotates at the speed $n_0$. Since the first ring gear R1 is held against rotation by the first brake B1, the output gear 2 coupled to the first carrier C1 rotates at a speed n1 indicated by a point of intersection between the vertical line indicative of the first carrier C1 and a dotted straight line L1 interconnecting points which indicate, respectively, the rotation of the first sun gear S1 and the braked condition of the first ring gear R1. The rotational speeds of the elements of the third planetary gear train G3 which is coupled to the first planetary gear train G1 are also indicated by respective points of intersection with the dotted straight line L1. Specifically, the third sun gear S3 rotates at a speed $n_{11}$, the third carrier C3 is held against rotation together with the first ring gear R1, and the third ring gear R3 rotates at a speed $n_1$.

Inasmuch as the first carrier C1 and the third ring gear R3 are coupled to the second ring gear R2, the second ring gear R2 also rotates at the speed $n_1$. In the second planetary gear train G2, the second carrier C2 is held against rotation by the second brake B2. Therefore, the second sun gear S2 rotates at a speed $n_{12}$ indicated by a point of intersection between the vertical line indicative of the second sun gear S2 and a dotted straight line L1' interconnecting points which indicate, respectively, the rotation of the second ring gear R2 at the speed $n_1$ and the braked condition of the second carrier C2. Since the rotational speed $n_{12}$ is lower than the rotational speed of the input shaft $n_0$, the second sun gear S2 does not rotate at excessive speed.

Rather than disengaging the third clutch K3, the third clutch K3 may be engaged to connect the second carrier C2 and the third sun gear S3 for thereby interconnecting the first, second, and third planetary gear trains G1, G2, G3. In this case, the diagram showing the second planetary gear train G2 overlaps the diagram showing the first and third planetary gear trains G1, G3, as indicated by the two-dot-and-dash lines. When the second brake B2 is disengaged and the first brake B1 is engaged to hold the first ring gear R1 and the third carrier C3 against rotation, the output gear 2 rotates at the speed $n_1$ for a desired speed reduction ratio. However, the second sun gear S2 rotates at a speed $n_{13}$ indicated by a point of intersection between the vertical line indicative of the second sun gear S2 and an extension of the dotted straight line L1. Since the rotational speed $n_{13}$ is higher than that of the input shaft 1, the second sun gear S2 may rotate at excessive speed.

Figure 6:
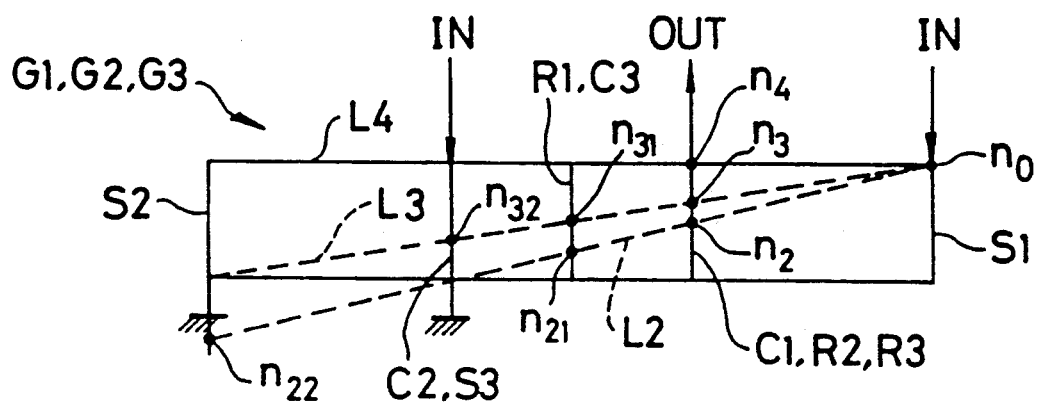

The second, third, and fourth gear ranges will be described below with reference to FIG. 6. In these gear ranges, the third clutch K3 (separating clutch) is engaged to connect the second carrier C2 and the third sun gear S3. Therefore, the first, second, and third planetary gear trains G1, G2, G3 are inter-connected to each other, and their speed diagram is shown together in FIG. 6.

In the 2ND range (gear position), the second brake B2 remains engaged, holding the second carrier C2 and the third sun gear S3 against rotation. The first sun gear S1 rotates at the same speed $n_0$ as the rotational speed of the input shaft 1. The various elements rotate at respective speeds indicated by points of intersection between the vertical lines indicative of the elements and a dotted straight line L2 between points which indicate, respectively, the rotation of the first sun gear S1 and the braked condition of the second carrier C2 and the third sun gear S3. The output gear 2 rotates at a speed $n_2$ indicated by a point of intersection between the dotted straight line L2 and the vertical line indicative of the first carrier C1 and the second and third ring gears R2, R3. The first ring gear R1 and the third carrier C3 rotate at a speed $n_{21}$, and the second sun gear S2 rotates as a speed $n_{22}$. As shown in FIG. 6, the rotational speeds of any elements are lower than the rotational speed $n_0$ of the input shaft 1, and no elements rotate at excessive speed.

In the 3RD range (gear position), the second brake B2 is disengaged, and the third brake B3 is engaged, holding the second sun gear S2 against rotation. The various elements rotate at respective speeds indicated by points of intersection with a dotted straight line L3. The output gear 2 rotates at a speed $n_3$ indicated by a point of intersection between the dotted straight line L3 and the vertical line indicative of the first carrier C1 and the second and third ring gears R2, R3. The first ring gear R1 and the third carrier C3 rotate at a speed $n_{31}$, and the second carrier C2 and the third sun gear S3 rotate at a speed $n_{32}$. The rotational speeds of any elements are lower than the rotational speed $n_0$ of the input shaft 1, and the elements do not rotate at excessive speed.

In the 4TH range (gear position), the third brake B3 is disengaged, and the second clutch K2 is engaged as well as the third clutch K3. Therefore, the first, second, and third planetary gear trains G1, G2, G3 rotate in unison with the input shaft 1. The first sun gear S1, the second carrier C2, and the third sun gear S3 rotate at the same speed $n_0$ as the rotational speed of the input shaft 1. At this time, the output gear 2 rotates at speed $n_4$ ($=n_0$) indicated by a point of intersection between the vertical line indicative of the first carrier C1 and the second and third ring gears R2, R3 and a horizontal solid straight line L4. As can be seen from FIG. 6, the rotational speeds of all the elements are the same as the rotational speed $n_0$ of the input shaft 1, and the elements are free of the problem of rotation at excessive speed.

Figure 7:
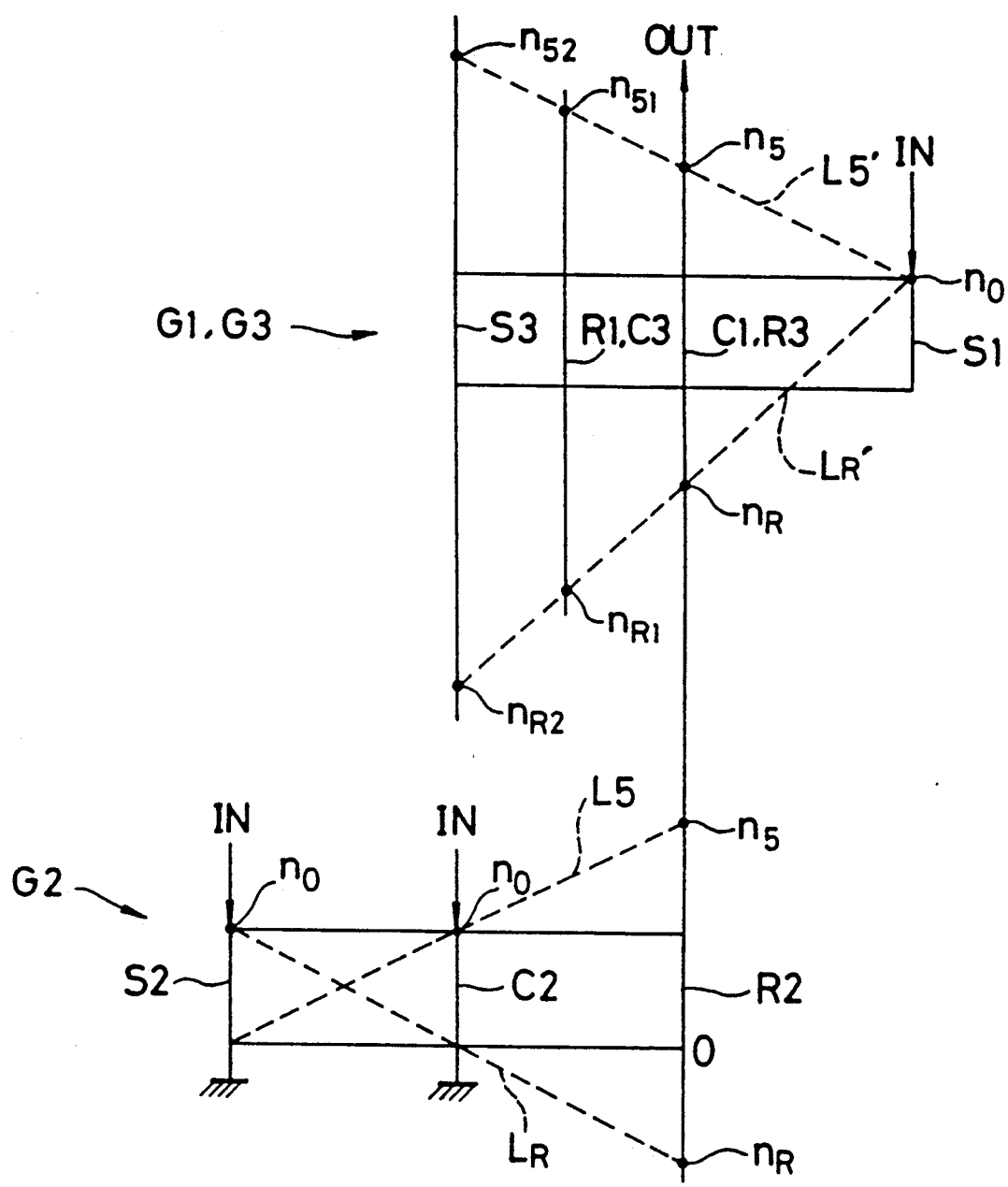

In the 5TH range (gear position), the third clutch K3 is disengaged to separate the second planetary gear train G2 from the first and third planetary gear trains G1, G3, and the elements rotate as shown in the speed diagram shown in FIG. 7. In the 5TH range, the third brake S3 is engaged to hold the second sun gear S2 against rotation. The second clutch K2 remains engaged to rotate the second carrier C2 at the same speed $n_0$ as the rotational speed of the input shaft 1. The elements rotate at respective speeds indicated by points of intersection with a dotted straight line L5. The output gear 2 rotates at a speed $n_5$ indicated by a point of intersection between the dotted straight line L5 and the vertical line indicative of the second ring gear R2.

In the first and third planetary gear trains G1, G3, which are coupled together, since the first carrier C1 and the third ring gear R3 rotate at the speed $n_5$ and the first sun gear S1, which is coupled to the input shaft 1, rotates at the speed $n_0$, the various elements rotate at respective speeds indicated by points of intersection with a dotted straight line L5' connecting points which indicate the rotation of the third ring gear R3 and the rotation of the first sun gear S1. Specifically, the first ring gear R1 and the third carrier C3 rotate at a speed $n_{51}$, and the third sun gear S3 rotates at a speed $n_{52}$, these rotational speeds $n_{51}$, $n_{52}$ being higher than the rotational speed $n_0$ of the input shaft 1. However, while the transmission is in the 5TH range, the vehicle incorporating the transmission runs at high speed and the resistance to the running of the vehicle is large. Accordingly, the engine of the vehicle is not driven in a high-speed rotation range, and the elements are substantially free of the problem of rotation at excessive speed. Although the first sun gear S1 is coupled to the input shaft 1 in this embodiment, the first sun gear S1 may be disengageably connected to the input shaft 1 through a clutch, and the clutch may be disengaged in the 5TH range. Such a modification completely prevents the elements from rotating at excessive speed.

In the REV range (gear position), the third clutch K3 is also disengaged to separate the second planetary gear train G2 from the first and third planetary gear trains G1, G3, and the elements rotate as shown in the speed diagram shown in FIG. 7. In the REV range, the second brake B2 is engaged to hold the second carrier C2 against rotation. The first clutch K1 is engaged instead of the second clutch K2, thus rotating the second sun gear S2 at the same speed $n_0$ as the rotational speed of the input shaft 1. The elements rotate at respective speeds indicated by points of intersection with a dotted straight line LR interconnecting points which indicate, respectively, the rotation of the second sun gear S2 and the braked condition of the second carrier C2. The output gear 2 rotates at a speed $n_R$ (negative value) indicated by a point of intersection between the dotted straight line LR and the vertical line indicative of the second ring gear R2.

In the first and third planetary gear trains G1, G3, which are coupled together, since the first carrier C1 and the third ring gear R3 rotate at the speed nR and the first sun gear S1, which is coupled to the input shaft 1, rotates at the speed $n_0$, the first ring gear R1 and third carrier C3 rotate at a speed $n_{R1}$ and the third sun gear S3 rotates at a speed $n_{R2}$, these speeds being indicated by points of intersection with a dotted straight line LR' connecting points which indicate the rotation of the third ring gear R3 and the rotation of the first sun gear S1. These speeds $n_{R1}$, $n_{R2}$ are of negative values, but their absolute values are larger than the value of the rotational speed n0 of the input shaft 1. However, while the transmission is in the REV range, the engine is seldom driven in a fully revved condition, and hence the elements are free of the problem of excessive-speed rotation. The problem of excessive-speed rotation can be completely solved if the first sun gear S1 is disengageably connected to the input shaft 1 through a clutch and the clutch is disengaged in the REV range.

Figures 8, 9:
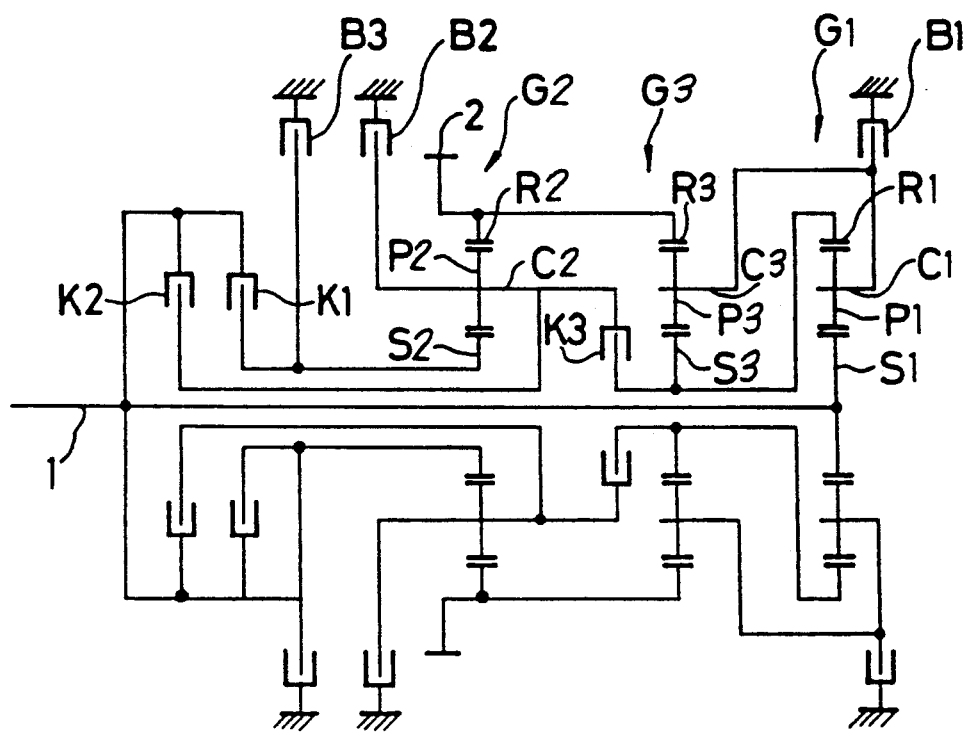
FIG. 8 is a diagram showing a skeleton of a planetary gear transmission according to a second embodiment of the present invention.
FIG. 9 is a table showing the relationship between gear ranges, engagement of clutches and brakes, and speed reduction ratios of the planetary gear transmission shown in FIG. 8.

2nd Embodiment:

FIG. 8 shows a skeleton of a planetary gear transmission according to a second embodiment of the present invention. The planetary gear transmission has first, second, and third planetary gear trains G1, G2, G3 which are coaxially arranged parallel to each other. The first, second, and third planetary gear trains G1, G2, G3 have respective first, second, and third sun gears S1, S2, S3 which are positioned centrally, respective first, second, and third planetary pinions P1, P2, P3 held in mesh with the first, second, and third sun gears S1, S2, S3, respectively, and rotatable therearound while rotating about their own axes, respective first, second, and third carriers C1, C2, C3 on which the respective first, second, and third planetary pinions P1, P2, P3 are rotatably supported and which are rotatable therewith around the first, second, and third sun gears S1, S2, S3, respectively, and respective first, second, and third ring gears R1, R2, R3 comprising internal gears meshing with the respective first, second, and third planetary pinions P1, P2, P3.

The second sun gear S2 is disengageably connected to an input shaft 1 through a first clutch K1, and can be held against rotation by a third brake B3. The second carrier C2 is disengageably connected to the input shaft 1 through a second clutch K2, and can be held against rotation by a second brake B2. The second carrier C2 is disengageably connected to the third sun gear S3 and the first ring gear R1 through a third clutch K3. The third sun gear S3 and the first ring gear R1 are securely connected to each other for rotation with each other at all times. The second ring gear R2 is connected to the third ring gear R3 and also to an output gear 2. The third carrier C3 is connected to the first carrier C1. The third carrier C3 and the first carrier C1 can be held against rotation by a first brake B1. The first sun gear S1 is connected to the input shaft 1.

In the planetary gear transmission of the above structure, gear positions can be established and gearshifts can be controlled by controlling engagement and disengagement of the first, second, and third clutches K1, K2, K3 and the first, second, and third brakes B1, B2, B3. More specifically, five forward gear positions or ranges (LOW, 2ND, 3RD, 4TH, and 5TH) and one reverse gear position (REV) can be established by engaging and disengaging the first, second, and third clutches K1, K2, K3 and the first, second, and third brakes B1, B2, B3, as shown in FIG. 9. The symbol O in FIG. 9 indicates that the corresponding clutch or brake is engaged. The second brake B2 in the LOW range is indicated by the symbol (O) because it is engaged but is not involved in the transfer of the drive power. Speed reduction ratios in the respective gear ranges are shown by way of illustrative example in FIG. 9.

The table of FIG. 9 shows that each of the five forward gear positions or ranges (LOW~5TH) can be established by engaging two of the clutches and brakes or engaging means. Any gearshifts between adjacent gear ranges can be achieved by disengaging one of the two engaging means and engaging the other engaging means, but not disengaging or engaging the two engaging means simultaneously. Therefore, the gearshifts can easily be controlled.

Figures 10, 11:
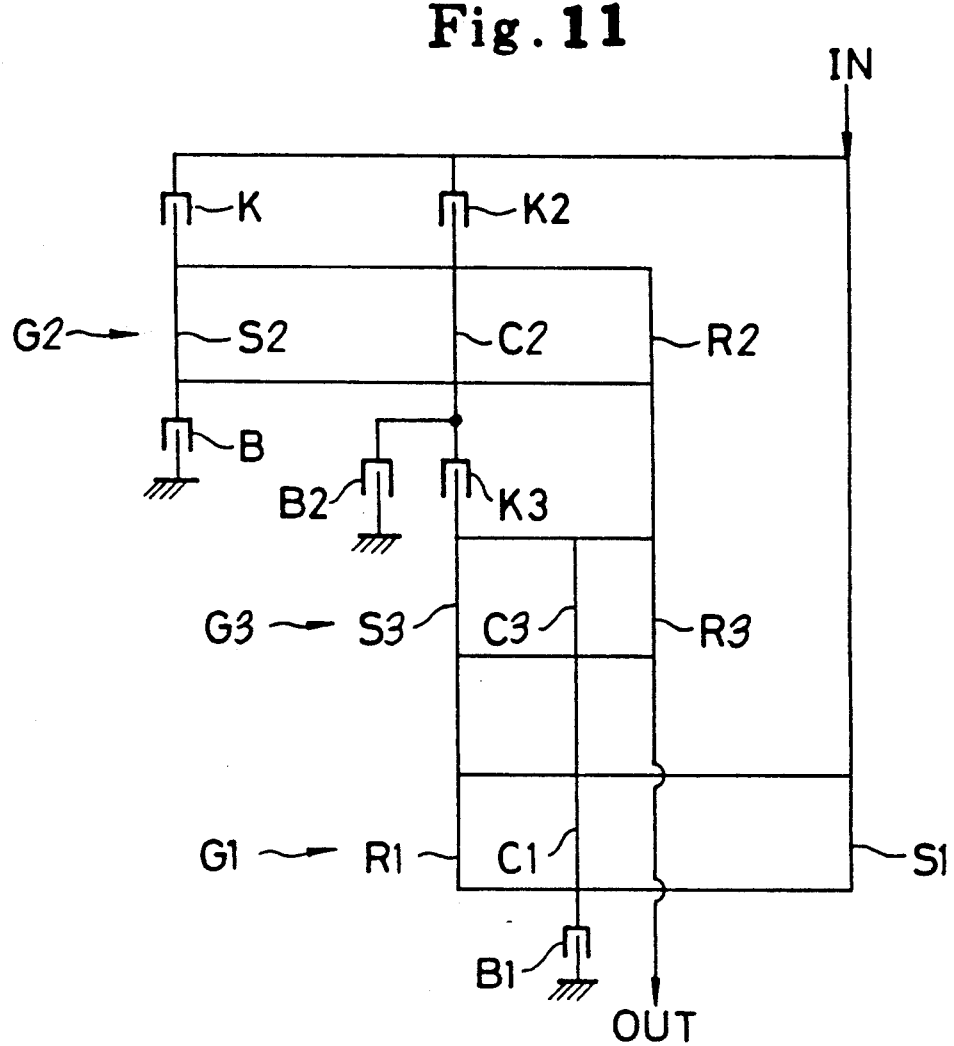
FIG. 10 is a table showing how elements are coupled into rotational members in the planetary gear transmission shown in FIG. 8.
FIGS. 11 through 14 are diagrams showing rotational speeds of elements of the planetary gear transmission shown in FIG. 8.

FIG. 10 shows how the elements (the sun gears, the carriers, and the ring gears) of the planetary gear transmission shown in FIG. 8 are coupled into rotational members. The second sun gear S2 singly serves as a second rotational member, and the second carrier C2, the third sun gear S3, and the first ring gear R1 are coupled to each other and jointly serve as a third rotational member. The third carrier C3 and the first carrier C1 are coupled to each other and jointly serve as a third rotational member. The second ring gear R2 and the third ring gear R3 are coupled to each other and jointly serve as a fourth rotational member. The first sun gear S1 singly serves as a fifth rotational member. As shown in FIG. 8, the third clutch K3 is disposed between the second carrier C2 and the third sun gear S3 which jointly serve as the second rotational member. Therefore, the second carrier C2 and the third sun gear S3 can be connected to and disconnected from each other by the third clutch K3.

FIG. 10 also illustrates ratios $\lambda$ between the number Zs of teeth of the sun gears and the number Zr of teeth of ring gears ($\lambda = Zs/Zr$).

The relationship between rotational speeds of the elements of the planetary gear transmission according to the second embodiment is shown in FIG. 11. The speed reduction ratios in the respective gear ranges will be described below with reference to FIG. 11.

Figure 12:
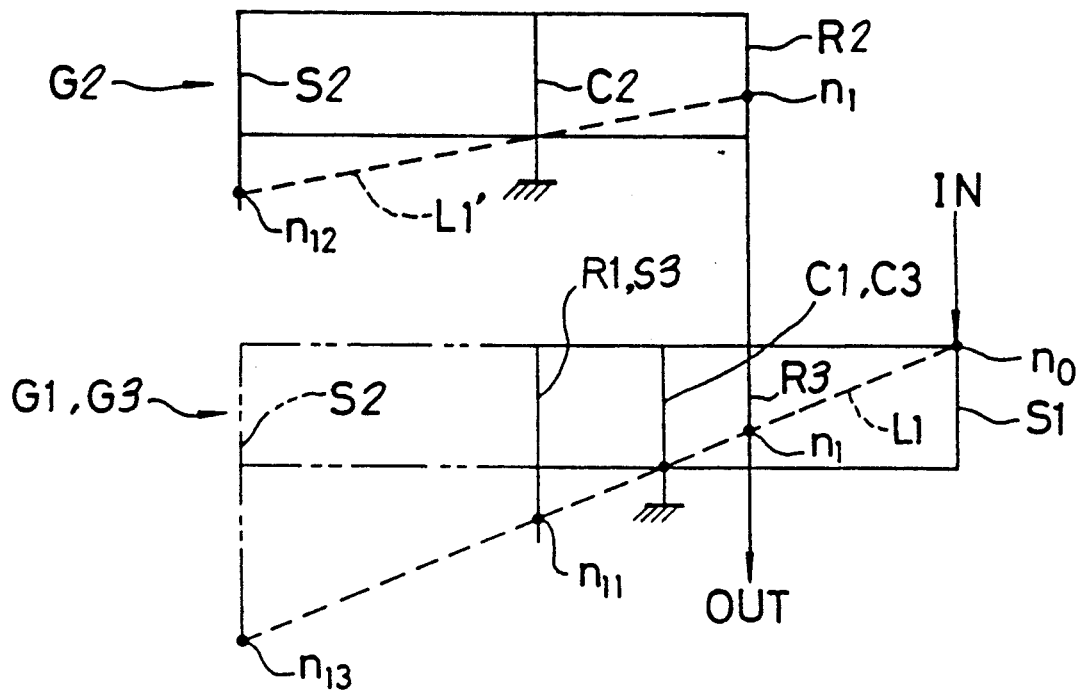

In the LOW range (gear position), all the clutches K1, K2, K3 and the third brake B3 are disengaged, and the first and second brakes B1, B2 are engaged. Since the first carrier C1 and the third carrier C3 (two elements) are mechanically coupled to each other, and the third sun gear S3 and the first ring gear R1 (two elements) are mechanically coupled to each other, the first and third planetary gear trains G1, G3 are integrally coupled to each other as a unitary planetary gear train, and may be plotted together as shown in FIG. 12. Because the third clutch K3 is disengaged, the second planetary gear train G2 is separate from the first and third planetary gear trains G1, G3, with only one element (i.e., the second ring gear R2) of the second planetary gear train G2 being coupled to the first and third planetary gear trains G1, G3. Consequently, the third clutch K3 functions as a separating clutch.

If the input shaft 1 rotates at a speed $n_0$, then the first sun gear S1 coupled to the input shaft 1 also rotates at the speed n0. Since the first and third carriers C1, C3 are held against rotation by the first brake B1, the third ring gear R3 and hence the output gear 2 rotate at a speed $n_1$ indicated by a point of intersection between the vertical line indicative of the third ring gear R3 and a dotted straight line L1 interconnecting points which indicate, respectively, the rotation of the first sun gear S1 and the braked condition of the first and third carriers C1, C3. The rotational speeds of the elements of the first and third planetary gear trains G1, G3 are also indicated by respective points of intersection with the dotted straight line L1. Specifically, the first ring gear R1 and the third sun gear S3 rotate at a speed $n_{11}$.

Inasmuch as the third ring gear R3 is connected to the second ring gear R2, the second ring gear R2 also rotates at the speed $n_1$. In the second planetary gear train G2, the second carrier C2 is held against rotation by the second brake B2. Therefore, the second sun gear S2 rotates at a speed $n_{12}$ indicated by a point of intersection between the vertical line indicative of the second sun gear S2 and a dotted straight line L1' interconnecting points which indicate, respectively, the rotation of the second ring gear R2 at the speed $n_1$ and the braked condition of the second carrier C2. Since the rotational speed $n_{12}$ is lower than the rotational speed of the input shaft $n_0$, the second sun gear S2 does not rotate at excessive speed.

Rather than disengaging the third clutch K3, the third clutch K3 may be engaged to connect the second carrier C2, the third sun gear S3, and the first ring gear R1 for thereby interconnecting the first, second, and third planetary gear trains G1, G2, G3. In this case, the diagram showing the second planetary gear train G1 overlaps the diagram showing the first and third planetary gear trains G1, G3, as indicated by the two-dot-and-dash lines. When the second brake B2 is disengaged and the first brake B1 is engaged to hold the first and third carriers C1, C3 against rotation, the output gear 2 rotates at the speed $n_1$ for a desired speed reduction ratio. However, the second sun gear S2 rotates at a speed $n_{13}$ indicated by a point of intersection between the vertical line indicative of the second sun gear S2 and an extension of the dotted straight line L1. Since the rotational speed $n_{13}$ is higher than that of the input shaft 1, the second sun gear S2 may rotate at excessive speed.

Figure 13:
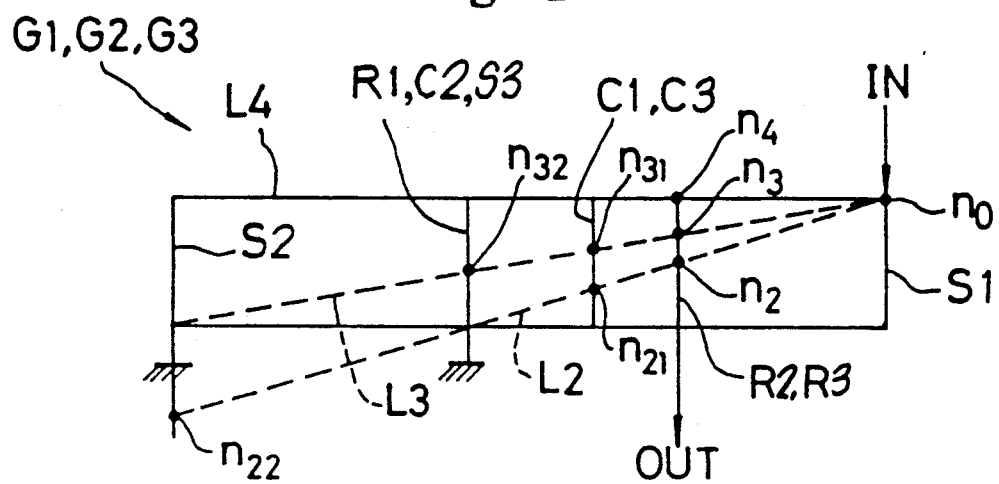

The second, third, and fourth gear ranges will be described below with reference to FIG. 13. In these gear ranges, the third clutch K3 (separating clutch) is engaged to connect the second carrier C2, the third sun gear S3, and the first ring gear R1. Therefore, the first, second, and third planetary gear trains G1, G2, G3 are interconnected to each other, and their speed diagram is shown together in FIG. 13.

In the 2ND range (gear position), the second brake B2 remains engaged, holding the second carrier C2, the third sun gear S3, and the first ring gear R1 against rotation. The first sun gear S1 rotates at the same speed $n_0$ as the rotational speed of the input shaft 1. The various elements rotate at respective speeds indicated by points of intersection between the vertical lines indicative of the elements and a dotted straight line L2 between points which indicate, respectively, the rotation of the first sun gear S1 and the braked condition of the second carrier C2, the third sun gear S3, and the first ring gear R1. The output gear 2 rotates at a speed $n_2$ indicated by a point of intersection between the dotted straight line L2 and the vertical line indicative of the second and third ring gears R2, R3. The first and third carriers C1, C3 rotate at a speed $n_{21}$, and the second sun gear S2 rotates as a speed $n_{22}$. As shown in FIG. 13, the rotational speeds of any elements are lower than the rotational speed $n_0$ of the input shaft 1, and no elements rotate at excessive speed.

In the 3RD range (gear position), the second brake B2 is disengaged, and the third brake B3 is engaged, holding the second sun gear S2 against rotation. The various elements rotate at respective speeds indicated by points of intersection with a dotted straight line L3. The output gear 2 rotates at a speed $n_3$ indicated by a point of intersection between the dotted straight line L3 and the vertical line indicative of the second and third ring gears R2, R3. The first and third carriers C1, C3 rotate at a speed $n_{31}$, and the second carrier C2, the third sun gear S3, and the first ring gear R1 rotate at a speed $n_{32}$. The rotational speeds of any elements are lower than the rotational speed $n_0$ of the input shaft 1, and the elements do not rotate at excessive speed.

In the 4TH range (gear position), the third brake B3 is disengaged, and the second clutch K2 is engaged as well as the third clutch K3. Therefore, the first, second, and third planetary gear trains G1, G2, G3 rotate in unison with the input shaft 1. The first sun gear S1, the second carrier C2, the third sun gear S3, and the first ring gear R1 rotate at the same speed $n_0$ as the rotational speed of the input shaft 1. At this time, the output gear 2 rotates at a speed $n_4$ ($=n_0$) indicated by a point of intersection between the vertical line indicative of the second and third ring gears R2, R3 and a horizontal solid straight line L4. As can be seen from FIG. 13, the rotational speeds of all the elements are the same as the rotational speed $n_0$ of the input shaft 1, and the elements are free of the problem of rotation at excessive speed.

Figure 14:
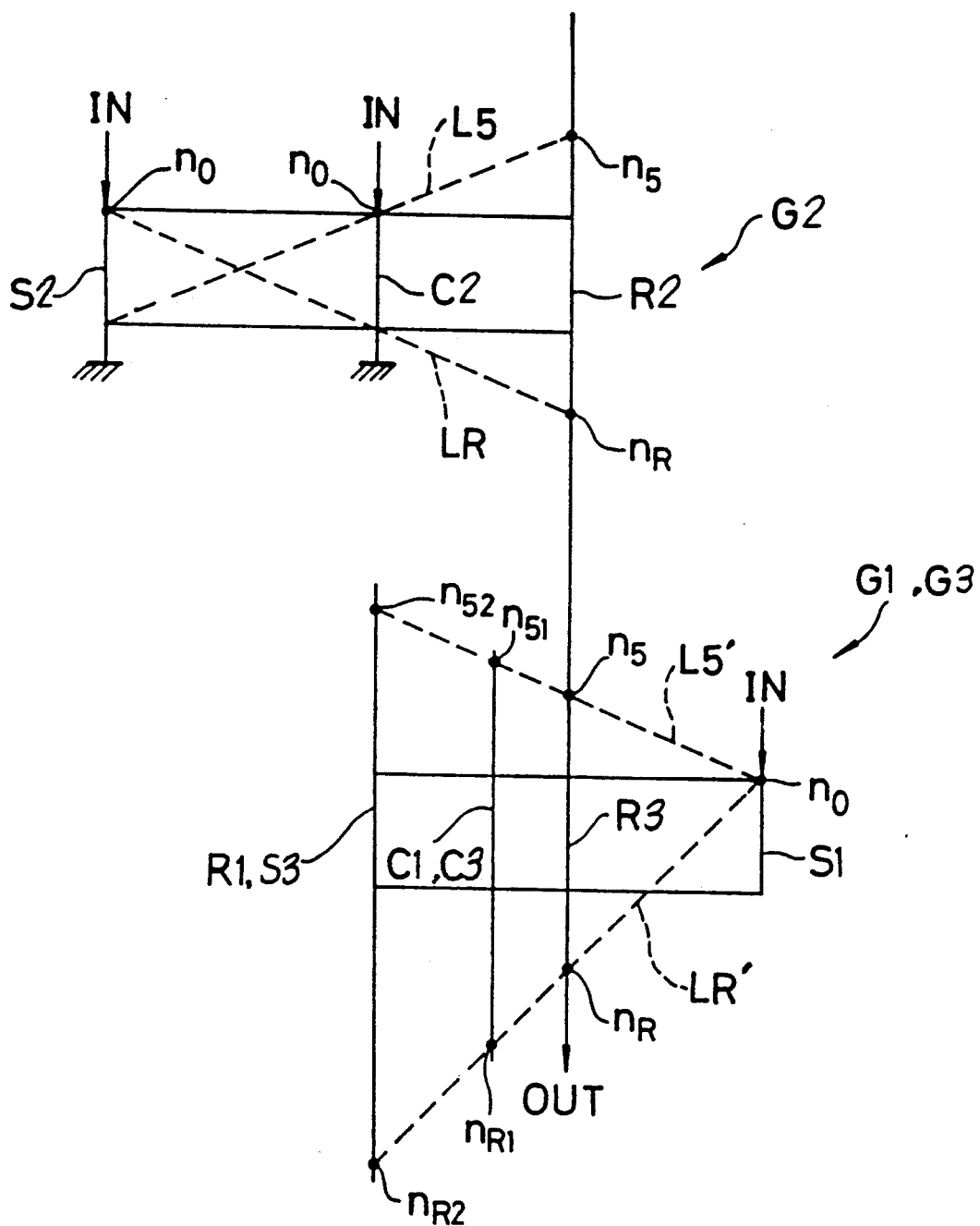

In the 5TH range (gear position), the third clutch K3 is disengaged to separate the second planetary gear train G2 from the first and third planetary gear trains G1, G3, and the elements rotate as shown in the speed diagram shown in FIG. 14. In the 5TH range, the third brake B3 is engaged to hold the second sun gear S2 against rotation. The second clutch K2 remains engaged to rotate the second carrier C2 at the same speed $n_0$ as the rotational speed of the input shaft 1. The elements rotate at respective speeds indicated by points of intersection with a dotted straight line L5. The output gear 2 rotates at a speed $n_5$ indicated by a point of intersection between the dotted straight line L5 and the vertical line indicative of the second ring gear R2.

In the first and third planetary gear trains G1, G3 which are coupled together, since the third ring gear R3 rotates at the speed $n_5$ and the first sun gear S1 coupled to the input shaft 1 rotates at the speed $n_0$, the various elements rotate at respective speeds indicated by points of intersection with a dotted straight line L5' connecting points which indicate the rotation of the third ring gear R3 and the rotation of the first sun gear S1. Specifically, the first and third carriers C1, C3 rotate at a speed $n_{51}$, and the third sun gear S3 and the first ring gear R1 rotate at a speed $n_{52}$, these rotational speeds $n_{51}$, $n_{52}$ being higher than the rotational speed $n_0$ of the input shaft 1. However, while the transmission is in the 5TH range, the vehicle incorporating the transmission runs at high speed and the resistance to the running of the vehicle is large. Accordingly, the engine of the vehicle is not driven in a high-speed rotation range, and the elements are substantially free of the problem of rotation at excessive speed. Although the first sun gear S1 is coupled to the input shaft 1 in this embodiment, the first sun gear S1 may be disengageably connected to the input shaft 1 through a clutch, and the clutch may be disengaged in the 5TH range. Such a modification completly prevents the elements from rotating at excessive speed.

In the REV range (gear position), the third clutch K3 is also disengaged to separate the second planetary gear train G2 from the first and third planetary gear trains G1, G3, and the elements rotate as shown in the speed diagram shown in FIG. 14. In the REV range, the second brake B2 is engaged to hold the second carrier C2 against rotation. The first clutch K1 is engaged instead of the second clutch K2, thus rotating the second sun gear S2 at the same speed $n_0$ as the rotational speed of the input shaft 1. The elements rotate at respective speeds indicated by points of intersection with a dotted straight line LR interconnecting points which indicate, respectively, the rotation of the second sun gear S2 and the braked condition of the second carrier C2. The output gear 2 rotates at a speed $n_R$ (negative value) indicated by a point of intersection between the dotted straight line LR and the vertical line indicative of the second ring gear R2.

In the first and third planetary gear trains G1, G3 which are coupled together, since the third ring gear R3 rotates at the speed $n_R$ and the first sun gear S1 coupled to the input shaft 1 rotates at the speed $n_0$, the first and third carriers C1, C3 rotate at a speed $n_{R1}$ and the third sun gear S3 and the first ring gear R1 rotate at, a speed $n_{R2}$, these speeds being indicated by points of intersection with a dotted straight line LR' connecting points which indicate the rotation of the third ring gear R3 and the rotation of the first sun gear S1. These speeds $n_{R1}$, $n_{R2}$ are of negative values, but their absolute values are larger than the value of the rotational speed $n_0$ of the input shaft 1. However, while the transmission is in the REV range, the engine is seldom driven in a fully revved condition, and hence the elements are free of the problem of excessive-speed rotation. The problem of excessive-speed rotation can be completely solved if the first sun gear S1 is disengageably connected to the input shaft 1 through a clutch and if the clutch is disengaged in the REV range.

Figures 15, 16:
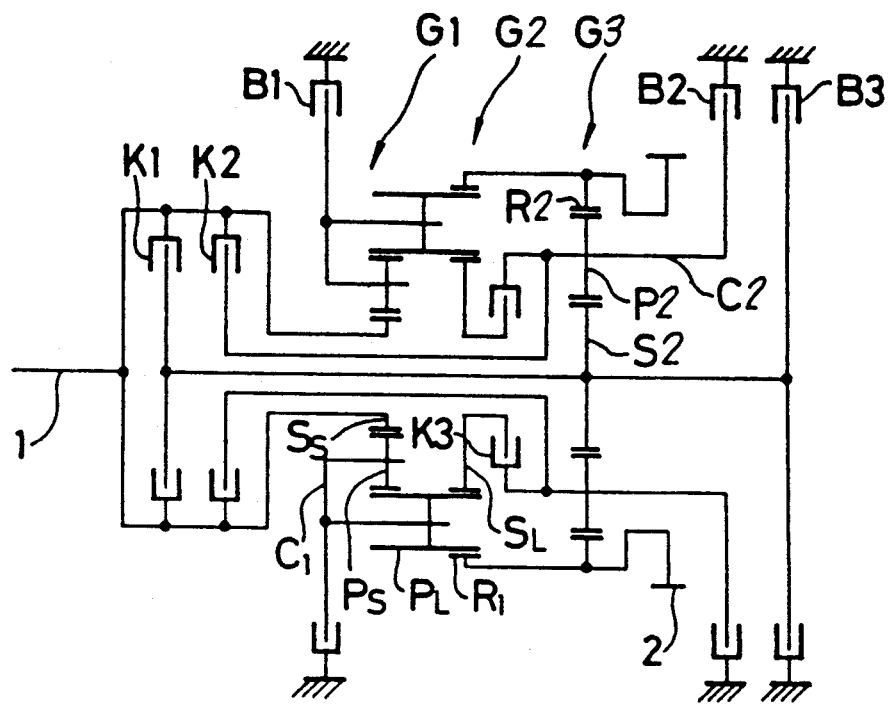
FIG. 15 is a diagram showing a skeleton of a planetary gear transmission according to a third embodiment of the present invention.
FIG. 16 is a table showing the relationship between gear ranges, engagement of clutches and brakes, and speed reduction ratios of the planetary gear transmission shown in FIG. 15.

3rd Embodiment:

FIG. 15 shows a skeleton of a planetary gear transmission according to a third embodiment of the present invention. The planetary gear transmission has first, second, and third planetary gear trains G1, G2, G3 which are coaxially arranged parallel to each other.

The first and third planetary gear trains G1, G3 share a carrier C1 and a ring gear R1, and jointly serve as a Ravigneaux gear train. The Ravigneaux gear train G1, G3 comprises a large sun gear $S_L$ and a small sun gear $S_S$ that are disposed parallel to each other coaxially with the input shaft 1, a short pinion $P_S$ meshing with the small sun gear $S_S$ and rotatable therearound while rotating about its own axis, a long pinion $P_L$ meshing with the short pinion $P_2$ and the large sun gear $S_L$ and rotatable around the large sun gear $S_L$ while rotating about its own axis, a Ravigneaux carrier C1 on which the short and long pinions $P_S$, $P_L$ are rotatably supported and which is rotatable about the axis of the large and small sun gears $S_L$, $S_S$, and a Ravigneaux ring gear R1 comprising an internal gear meshing with the long pinion $P_L$. The first planetary gear train G1 is composed of the small sun gear $S_S$, the Ravigneaux carrier C1, and the Ravigneaux ring gear R1. The third planetary gear train G3 is composed of the large sun gear $S_L$ the Ravigneaux carrier C1, and the Ravigneaux ring gear R1.

The second planetary gear train G2 comprises a second sun gear S2, a second pinion P2, a second carrier C2, and a second ring gear R2.

The small sun gear $S_S$ is coupled to an input shaft I, and the Ravigneaux carrier C1 can be held against rotation by a first brake B1. The Ravigneaux ring gear R1 is coupled to the second ring gear R2 and an output gear 2. The second sun gear S2 is disengageably connected to the input shaft 1 through a first clutch HI, and can be held against rotation by a third brake B3. The second carrier C2 is disengageably connected to the input shaft 1 through a second clutch K2, and is also disengageably connected to the large sun gear $S_L$ through a third clutch K3. The second carrier C2 can be held against rotation by a second brake B2.

In the planetary gear transmission of the above structure, gear positions can be established and gearshifts can be controlled by controlling engagement and disengagement of the first, second, and third clutches K1, K2, K3 and the first, second, and third brakes B1, B2, B3. More specifically, five forward gear positions or ranges (LOW, 2ND, 3RD, 4TH, and 5TH) and one reverse gear position (REV) can be established by engaging and disengaging the first, second, and third clutches K1, K2, K3 and the first, second, and third brakes B1, B2, B3, as shown in FIG. 16. The symbol O in FIG. 16 indicates that the corresponding clutch or brake is engaged. The second brake B2 in the LOW range is indicated by the symbol (O) because it is engaged but is not involved in the transfer of the drive power. Speed reduction ratios in the respective gear ranges are shown by way of illustrative example in FIG. 16.

The table of FIG. 16 shows that each of the five forward gear positions or ranges (LOW~5TH) can be established by engaging two of the clutches and brakes or engaging means. Any gearshifts between adjacent gear ranges can be achieved by disengaging one of the two engaging means and engaging the other engaging means, but not disengaging or engaging the two engaging means simultaneously. Therefore, the gearshifts can easily be controlled.

Figures 17, 18:
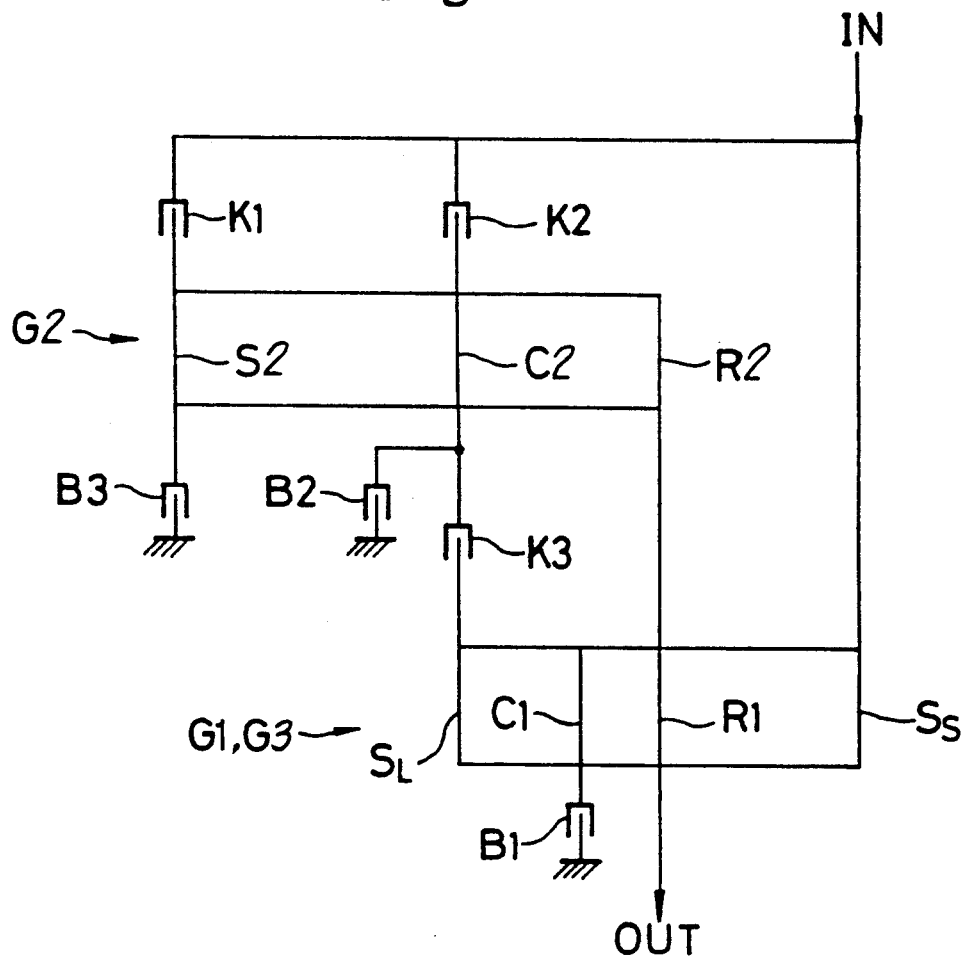
FIG. 17 is a table showing how elements are coupled into rotational members in the planetary gear transmission shown in FIG. 15.
FIGS. 18 through 21 are diagrams showing rotational speeds of elements of the planetary gear transmission shown in FIG. 15.
Figure 19:
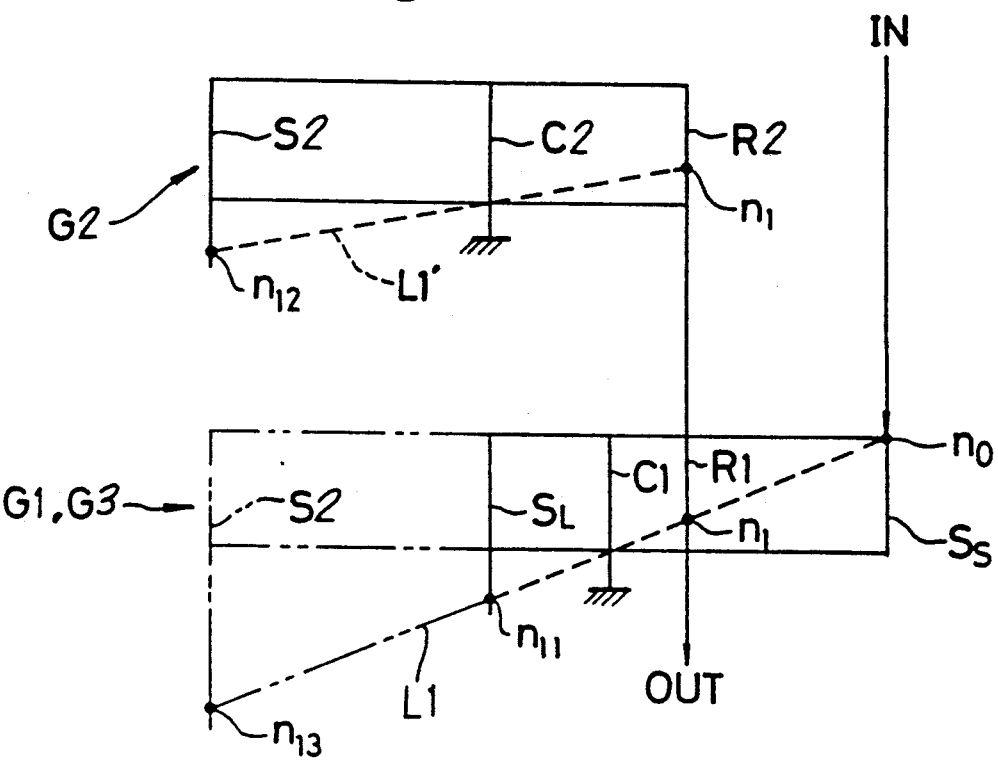

FIG. 17 shows how the elements (the sun gears, the carriers, and the ring gears) of the planetary gear transmission shown in FIG. 15 are coupled into rotational members. The second sun gear S2 singly serves as a first rotational member, and the large sun gear $S_L$ and the second carrier C2 are coupled to each other and jointly serve as a second rotational member. The Ravigneaux carrier C1 shared by the first and third planetary gear trains G1, G3 serves as a third rotational member. The Ravigneaux ring gear R1 shared by the first and third planetary gear trains G1, G3 and the second ring gear R2 are coupled to each other and jointly serve as a fourth rotational member. The small sun gear $S_S$ singly serves as a fifth rotational member. As shown in FIG. 15, the third clutch K3 is disposed between the large sun gear $S_L$ of the second rotational member and the second carrier C2. Therefore, the large sun gear $S_L$ and the second carrier C2 can be connected to and disconnected from each other by the third clutch K3.

FIG. 17 also illustrates ratios $\lambda$ between the numbers Zs of teeth of the sun gears and the number Zr of teeth of ring gears ($\lambda = Zs/Zr$).

The relationship between rotational speeds of the elements of the planetary gear transmission according to the second embodiment is shown in FIG. 18. The speed reduction ratios in the respective gear ranges will be described below with reference to FIG. 18. The first and third planetary gear trains G1, G3 that jointly serve as the Ravigneaux gear train are always combined with each other, and hence are shown as combined in FIG. 18. Since the first planetary gear train G1 comprises a double-pinion-type gear train composed of the small pinion $P_2$ and the large pinion $P_L$ the ring gear rotates with respect to the sun gear in a direction opposite to that in a single-pinion-type gear train. Therefore, the ring gear R1 and the sun gear $S_S$ are positioned with respect to the carrier C1 in opposite relation to those in the other gear train.

In the LOW range (gear position), all the clutches K1, K2, K3 and the third brake B3 are disengaged, and the first and second brakes B1, B2 are engaged. Since the third clutch K3 is disengaged, the second planetary gear train G2 is separate from the first and third planetary gear trains G1, G3 which are combined as the Ravigneaux gear train, only one element (i.e., the second ring gear R2) of the second planetary gear train G2 is coupled to the first and third planetary gear trains G1, G3. Consequently, the third clutch K3 functions as a separating clutch.

If the input shaft 1 rotates at a speed $n_0$, then the small sun gear $S_S$ coupled to the input shaft 1 also rotates at the speed $n_0$. Since the Ravigneaux carrier C1 is held against rotation by the first brake B1, the Ravigneaux ring gear R1 and hence the output gear 2 rotate at a speed $n_1$ indicated by a point of intersection between the vertical line indicative of the Ravigneaux ring gear R1 and a dotted straight line L1 interconnecting points which indicate, respectively, the rotation of the small sun gear $S_S$ and the braked condition of the Ravigneaux carrier C1. The rotational speeds of the elements of the first and third planetary gear trains G1, G3 are also indicated by respective points of intersection with the dotted straight line L1. Specifically, the large sun gear $S_L$ rotates at a speed $n_{11}$.

Inasmuch as the Ravigneaux ring gear R1 is connected to the second ring gear R2, the second ring gear R2 also rotates at the speed $n_1$. In the second planetary gear train G2, the second carrier C2 is held against rotation by the second brake B2. Therefore, the second sun gear S2 rotates at a speed $n_{12}$ indicated by a point of intersection between the vertical line indicative of the second sun gear S2 and a dotted straight line L1' interconnecting points which indicate, respectively, the rotation of the second ring gear R2 at the speed $n_1$ and the braked condition of the second carrier C2. Since the rotational speed $n_{12}$ is lower than the rotational speed of the input shaft $n_0$, the second sun gear S2 does not rotate at excessive speed.

Rather than disengaging the third clutch K3, the third clutch K3 may be engaged to connect the second carrier C2 and the large sun gear $S_L$ for thereby interconnecting the first, second, and third planetary gear trains G1, G2, G3. In this case, the diagram showing the second planetary gear train G2 overlaps the diagram showing the first and third planetary gear trains G1, G3, as indicated by the two-dot-and-dash lines. When the second brake B2 is disengaged and the first brake B1 is engaged to hold the first carrier C1 against rotation, the output gear 2 rotates at the speed $n_1$ for a desired speed reduction ratio. However, the second sun gear S2 rotates at a speed $n_{13}$ indicated by a point of intersection between the vertical line indicative of the second sun gear S2 and an extension of the dotted straight line L1. Since the rotational speed $n_{13}$ is higher than that of the input shaft 1, the second sun gear S2 may rotate at excessive speed.

Figure 20:
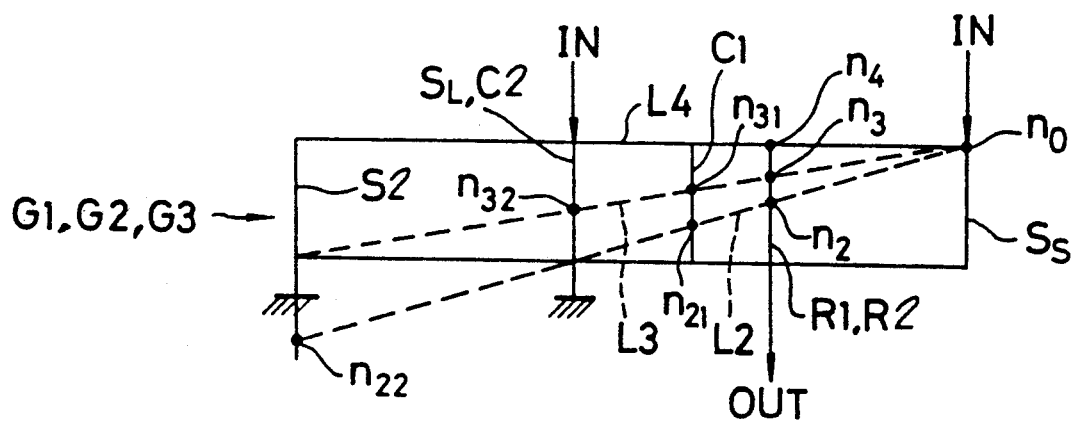

The second, third, and fourth gear ranges will be described below with reference to FIG. 20. In these gear ranges, the third clutch K3 (separating clutch) is engaged to connect the second carrier C2 and the large sun gear $S_L$. Therefore, the first, second, and third planetary gear trains G1, G2, G3 are interconnected to each other, and their speed diagram is shown together in FIG. 20.

In the 2ND range (gear position), the second brake B2 remains engaged, holding the second carrier C2 and the large sun gear $S_L$ against rotation. The small sun gear $S_L$ rotates at the same speed $n_0$ as the rotational speed of the input shaft 1. The various elements rotate at respective speeds indicated by points of intersection between the vertical lines indicative of the elements and a dotted straight line L2 between points which indicate, respectively, the rotation of the small sun gear $S_S$ and the braked condition of the second carrier C2 and the large sun gear $S_L$. The output gear 2 rotates at a speed $n_2$ indicated by a point of intersection between the dotted straight line L2 and the vertical line indicative of the Ravigneaux ring gear R1 and the second ring gear R2. The Ravigneaux carrier C1 rotates at a speed $n_{21}$, and the second sun gear S2 rotates as a speed $n_{22}$. As shown in FIG. 20, the rotational speeds of any elements are lower than the rotational speed $n_0$ of the input shaft 1, and no elements rotate at excessive speed.

In the 3RD range (gear position), the second brake B2 is disengaged, and the third brake B3 is engaged, holding the second sun gear S2 against rotation. The various elements rotate at respective speeds indicated by points of intersection with a dotted straight line L3. The output gear 2 rotates at a speed $n_3$ indicated by a point of intersection between the dotted straight line L3 and the vertical line indicative of the Ravigneaux and second ring gears R1, R2. The Ravigneaux carrier C1 rotates at a speed $n_{31}$, and the second carrier C2 and the large sun gear $S_L$ rotate at a speed $n_{32}$. The rotational speeds of any elements are lower than the rotational speed $n_0$ of the input shaft I, and the elements do not rotate at excessive speed.

In the 4TH range (gear position), the third brake B3 is disengaged, and the second clutch K2 is engaged as well as the third clutch K3. Therefore, the first, second, and third planetary gear trains G1, G2, G3 rotate in unison with the input shaft 1. The large sun gear $S_L$ and the second carrier C2 rotate at the same speed $n_0$ as the rotational speed of the input shaft 1. At this time, the output gear 2 rotates at a speed $n_4 (= n_0)$ indicated by a point of intersection between the vertical line indicative of the Ravigneaux and second ring gears R1, R2 and a horizontal solid straight line L4. As can be seen from FIG. 20, the rotational speeds of all the elements are the same as the rotational speed $n_0$ of the input shaft 1, and the elements are free of the problem of rotation at excessive speed.

Figure 21:
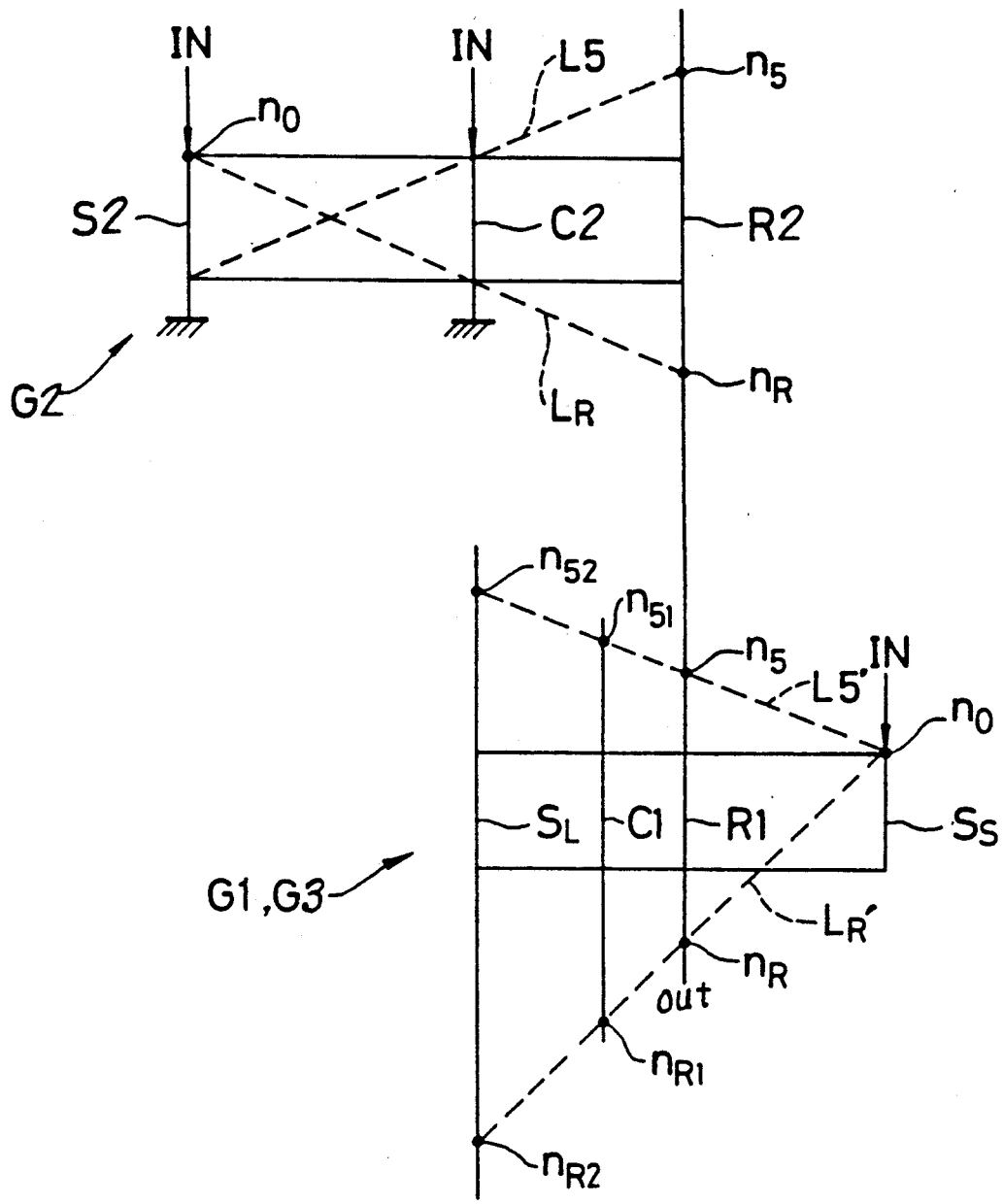

In the 5TH range (gear position), the third clutch K3 is disengaged to separate the second planetary gear train G2 from the first and third planetary gear trains G1, G3, and the elements rotate as shown in the speed diagram shown in FIG. 21. In the 5TH range, the second brake S2 is engaged to hold the second sun gear S2 against rotation. The second clutch K2 remains engaged to rotate the second carrier C2 at the same speed $n_0$ as the rotational speed of the input shaft 1. The elements rotate at respective speeds indicated by points of intersection with a dotted straight line L5. The output gear 2 rotates at a speed n5 indicated by a point of intersection between the dotted straight line L5 and the vertical line indicative of the second ring gear R2.

In the Ravigneaux gear train, i.e., the combined first and third planetary gear trains G1, G3, since the Ravigneaux ring gear R1 rotates at the speed $n_5$ and the small sun gear $S_S$ coupled to the input shaft 1 rotates at the speed $n_0$, the various elements rotate at respective speeds indicated by points of intersection with a dotted straight line L5' connecting points which indicate the rotation of the Ravigneaux ring gear R1 and the rotation of the small sun gear $S_S$. Specifically, the Ravigneaux carrier C1 rotates at a speed $n_{51}$, and the large sun gear $S_L$ rotates at a speed $n_{52}$, these rotational speeds $n_{51}$, $n_{52}$ being higher than the rotational speed $n_0$ of the input shaft 1. However, while the transmission is in the 5TH range, the vehicle incorporating the transmission runs at high speed and the resistance to the running of the vehicle is large. Accordingly, the engine of the vehicle is not driven in a high-speed rotation range, and the elements are substantially free of the problem of rotation at excessive speed.

In the REV range (gear position), the third clutch K3 is also disengaged to separate the second planetary gear train G2 from the first and third planetary gear trains G1, G3, and the elements rotate as shown in the speed diagram shown in FIG. 21. In the REV range, the second brake B2 is engaged to hold the second carrier C2 against rotation. The first clutch K1 is engaged instead of the second clutch K2, thus rotating the second sun gear S2 at the same speed $n_0$ as the rotational speed of the input shaft 1. The elements rotate at respective speeds indicated by points of intersection with a dotted straight line LR interconnecting points which indicate, respectively, the rotation of the second sun gear S2 and the braked condition of the second carrier C2. The output gear 2 rotates at a speed $n_R$ (negative value) indicated by a point of intersection between the dotted straight line LR and the vertical line indicative of the second ring gear R2.

In the first and third planetary gear trains G1, G3 which are coupled together, since the Ravigneaux ring gear R1 rotates at the speed $n_R$ and the small sun gear $S_S$ coupled to the input shaft 1 rotates at the speed $n_0$, the Ravigneaux carrier C1 rotates at a speed $n_{R1}$ and the large sun gear $S_L$ rotates at a speed $n_{R2}$, these speeds being indicated by points of intersection with a dotted straight line LR' connecting points which indicate the rotation of the Ravigneaux ring gear R1 and the rotation of the small sun gear $S_S$. These speeds $n_{R1}$, $n_{R2}$ are of negative values, but their absolute values are larger than the value of the rotational speed $n_0$ of the input shaft 1. However, while the transmission is in the REV range, the engine is seldom driven in a fully revved condition, and hence the elements are free of the problem of excessive-speed rotation.

Figures 22, 23:
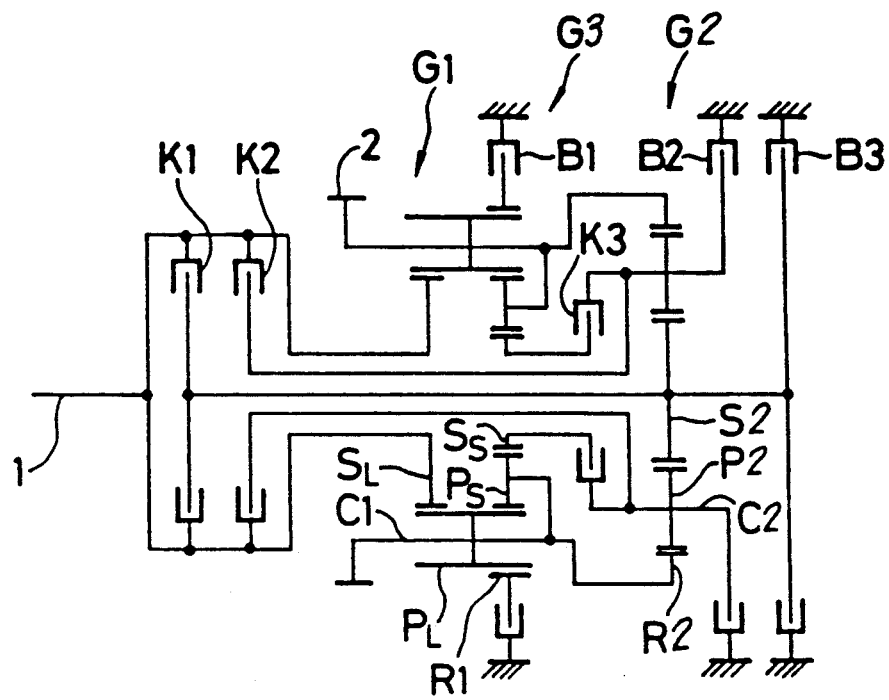
FIG. 22 is a diagram showing a skeleton of a planetary gear transmission according to a fourth embodiment of the present invention.
FIG. 23 is a table showing the relationship between gear ranges, engagement of clutches and brakes, and speed reduction ratios of the planetary gear transmission shown in FIG. 22.

4th Embodiment:

FIG. 22 shows a skeleton of a planetary gear transmission according to a fourth embodiment of the present invention. The planetary gear transmission has first, second, and third planetary gear trains G1, G2, G3 which are coaxially arranged parallel to each other.

The first and third planetary gear trains G1, G3 share a carrier C1 and a ring gear R1, and jointly serve as a Ravigneaux gear train. The first planetary gear train G1 is composed of a large sun gear $S_L$, a Ravigneaux carrier C1, and a Ravigneaux ring gear R1. The third planetary gear train G3 is composed of a small sun gear $S_S$, the Ravigneaux carrier C1, and the Ravigneaux ring gear R1.

The second planetary gear train G2 comprises a second sun gear S2, a second pinion P2, a second carrier C2, and a second ring gear R2.

The large sun gear $S_L$ is coupled to an input shaft I, and the Ravigneaux carrier C1 is connected to an output gear 2 and the second ring gear R2. The Ravigneaux ring gear R1 can be held against rotation by a first brake B1. The second sun gear S2 is disengageably connected to the input shaft 1 through a first clutch K1, and can be held against rotation by a third brake B3. The second carrier C2 is disengageably connected to the input shaft 1 through a second clutch K2, and is also disengageably connected to the small sun gear $S_S$ through a third clutch K3. The second carrier C2 can be held against rotation by a second brake B2.

In the planetary gear transmission of the above structure, gear positions can be established and gearshifts can be controlled by controlling engagement and disengagement of the first, second, and third clutches K1, K2, K3 and the first, second, and third brakes B1, B2, B3. More specifically, five forward gear positions or ranges (LOW, 2ND, 3RD, 4TH, and 5TH) and one reverse gear position (REV) can be established by engaging and disengaging the first, second, and third clutches K1, K2, K3 and the first, second, and third brakes B1, B2, B3, as shown in FIG. 23. The symbol O in FIG. 23 indicates that the corresponding clutch or brake is engaged. The second brake B2 in the LOW range is indicated by the symbol (O) because it is engaged but is not involved in the transfer of the drive power. Speed reduction ratios in the respective gear ranges are shown by way of illustrative example in FIG. 23.

The table of FIG. 23 shows that each of the five forward gear positions or ranges (LOW~5TH) can be established by engaging two of the clutches and brakes or engaging means. Any gearshifts between adjacent gear ranges can be achieved by disengaging one of the two engaging means and engaging the other engaging means, but not disengaging or engaging the two engaging means simultaneously. Therefore, the gearshifts can easily be controlled.

Figures 24, 25:
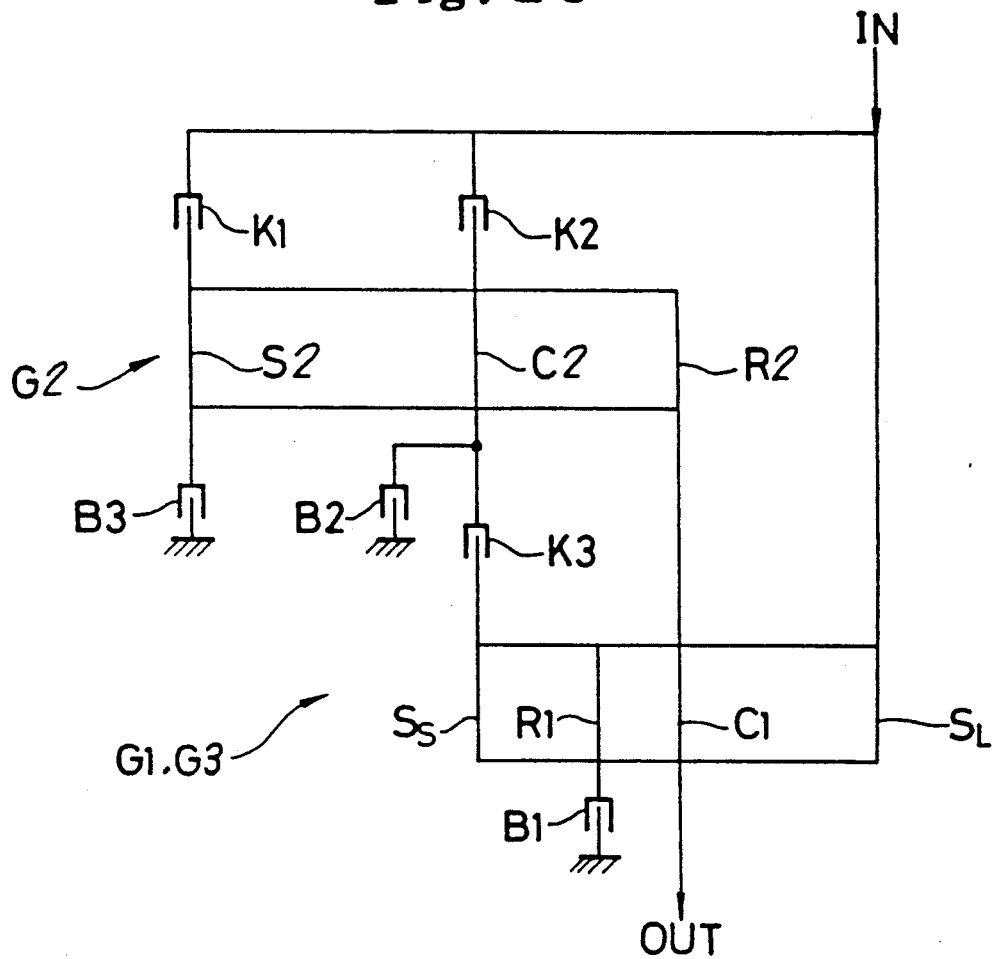
FIG. 24 is a table showing how elements are coupled into rotational members in the planetary gear transmission shown in FIG. 22.
FIG. 25 is a diagram showing rotational speeds of elements of the planetary gear transmission shown in FIG. 22.

FIG. 24 shows how the elements (the sun gears, the carriers, and the ring gears) of the planetary gear transmission shown in FIG. 22 are coupled into rotational members. FIG. 25 is a speed diagram of the elements of the planetary gear transmission. The second sun gear S2 singly serves as a first rotational member, and the small sun gear $S_S$ and the second carrier C2 are coupled to each other and jointly serve as a second rotational member. The Ravigneaux ring gear R1 shared by the first and third planetary gear trains G1, G3 serves as a third rotational member. The Ravigneaux carrier C1 shared by the first and third planetary gear trains G1, G3 and the second ring gear R2 are coupled to each other and jointly serve as a fourth rotational member. The large sun gear $S_L$ singly serves as a fifth rotational member. As shown in FIG. 22, the third clutch K3 is disposed between the small sun gear $S_S$ of the second rotational member and the second carrier C2. Therefore, the small sun gear $S_S$ and the second carrier C2 can be connected to and disconnected from each other by the third clutch K3.

The speed reduction ratios in the gear ranges based on the speed diagram that shows the rotational speeds of the elements of the transmission according to the fourth embodiment are the same as those in the third embodiment, and will not be described below. The first and third planetary gear trains G1, G3 that jointly serve as the Ravigneaux gear train are always combined with each other, and hence are shown as combined in FIG. 25. Since the third planetary gear train G3 comprises a double-pinion-type gear train, the ring gear rotates with respect to the sun gear in a direction opposite to that in a single-pinion-type gear train. Therefore, the ring gear R1 and the sun gear $S_S$ are positioned with respect to the carrier C1 in opposite relation to those in other gear train.

Figures 26, 27:
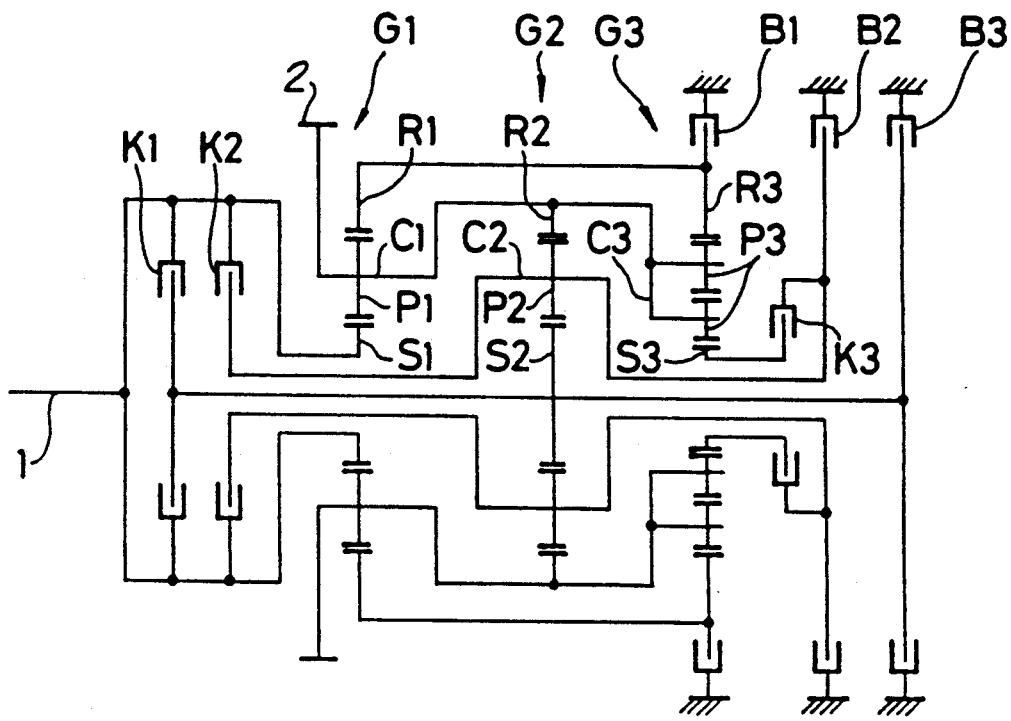
FIG. 26 is a diagram showing a skeleton of a planetary gear transmission according to a fifth embodiment of the present invention.
FIG. 27 is a table showing the relationship between gear ranges, engagement of clutches and brakes, and speed reduction ratios of the planetary gear transmission shown in FIG. 26.

5th Embodiment:

FIG. 26 shows a skeleton of a planetary gear transmission according to a fifth embodiment of the present invention. The planetary gear transmission has first, second, and third planetary gear trains G1, G2, G3 which are coaxially arranged parallel to each other. The first, second, and third planetary gear trains G1, G2, G3 have respective first, second, and third sun gears S1, S2, S3, respective first, second, and third planetary pinions P1, P2, P3, respective first, second, and third carriers C1, C2, C3, and respective first, second, and third ring gears R1, R2, R3. The third planetary gear train G3 comprises a double-pinion-type gear train, with the third pinion P3 comprising two meshing pinions.

The first sun gear S1 is securely connected to an input shaft 1, and the first carrier C1 is connected to the second ring gear R2, the third carrier C3, and an output gear 2. The first ring gear R1 can be held against rotation by a first brake B1. The first ring gear R1 and the third ring gear R3 are connected to each other. The second sun gear S2 is disengageably connected to the input shaft 1 through a first clutch K1. The second sun gear S2 can be held against rotation by a third brake B3. The second carrier C2 is disengageably connected to the input shaft 1 through a second clutch K2. The second carrier C2 can be held against rotation by a second brake B2. The second carrier C2 is disengageably connected to the third sun gear S3 through a third clutch K3.

In the planetary gear transmission of the above structure, gear positions can be established and gearshifts can be controlled by controlling engagement and disengagement of the first, second, and third clutches K1, K2, K3 and the first, second, and third brakes B1, B2, B3. More specifically, five forward gear positions or ranges (LOW, 2ND, 3RD, 4TH, and 5TH) and one reverse gear position (REV) can be established by engaging and disengaging the first, second, and third clutches K1, K2, K3 and the first, second, and third brakes B1, B2, B3, as shown in FIG. 27. The symbol O in FIG. 27 indicates that the corresponding clutch or brake is engaged. The second brake B2 in the LOW range is indicated by the symbol (O) because it is engaged but is not involved in the transfer of the drive power. Speed reduction ratios in the respective gear ranges vary depending on the number of teeth of each of the gears, but are shown by way of illustrative example in FIG. 27.

The table of FIG. 27 shows that each of the five forward gear positions or ranges (LOW~5TH) can be established by engaging two of the clutches and brakes or engaging means. Any gearshifts between adjacent gear ranges can be achieved by disengaging one of the two engaging means and engaging the other engaging means, but not disengaging or engaging the two engaging means simultaneously. Therefore, the gearshifts can easily be controlled.

Figures 28, 29:
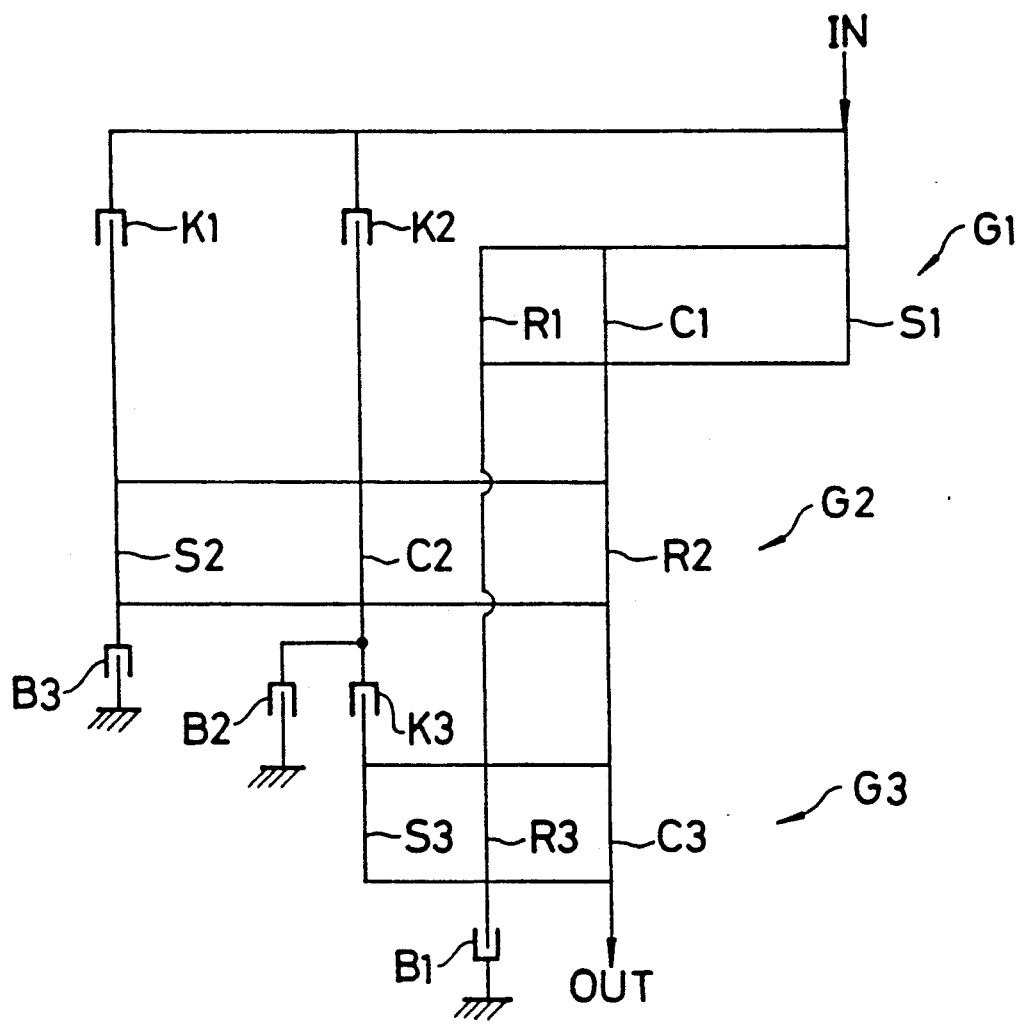
FIG. 28 is a table showing how elements are coupled into rotational members in the planetary gear transmission shown in FIG. 26.
FIG. 29 is a diagram showing rotational speeds of elements of the planetary gear transmission shown in FIG. 26.

FIG. 28 shows how the elements (the sun gears, the carriers, and the ring gears) of the planetary gear transmission shown in FIG. 26 are coupled into rotational members. FIG. 29 is a speed diagram of the elements of the planetary gear transmission. The second sun gear S2 singly serves as a first rotational member, and the second carrier C2 and the third sun gear S3 are coupled to each other and jointly serve as a second rotational member. The first ring gear R1 and the third ring gear R3 are coupled to each other and jointly serve as a third rotational member. The first carrier C1, the second ring gear R2, and the third carrier C3 are coupled to each other and jointly serve as a fourth rotational member. The first sun gear S1 singly serves as a fifth rotational member. As shown in FIG. 26, the third clutch K3 is disposed between the second carrier C2 and the third sun gear S3 which jointly serve as the second rotational member. Therefore, the second carrier C2 and the third sun gear S3 can be connected to and disconnected from each other by the third clutch K3.

FIG. 28 also illustrates ratios λ between the number Zs of teeth of the sun gears and the number Zr of teeth of ring gears (λ=Zs/Zr). Since the third planetary gear train G3 is of the double-pinion type the ratio λ thereof may be about 0.4, and the gear ratio thereof may be selected with a large degree of freedom. If the third planetary gear train G3 were of the single-pinion type, the ratio λ thereof would be required to be 0.6 or greater, requiring the pinion gear P3 to be small in diameter. Therefore, the third planetary gear train 03 would be complex in structure.

The speed reduction ratios in the gear ranges based on the speed diagram that shows the rotational speeds of the elements of the transmission according to the fourth embodiment are determined in the same manner as with the first embodiment and will not be described below. In FIG. 29, since the third planetary gear train G3 comprises a double-pinion-type gear train, the ring gear rotates with respect to the sun gear in a direction opposite to that in a single-pinion-type gear train. Therefore, the ring gear R3 and the sun gear S3 are positioned with respect to the carrier C3 in opposite relation to those in the other gear trains.

Although certain preferred embodiments of the present invention have been shown and described in detail, it should be understood that various changes and modifications may be made therein without departing from the scope of the appended claims.

What is claimed is:

1. A planetary gear transmission comprising:
   an input member;
   an output member;
   first, second, and third planetary gear trains arranged coaxially with each other and each having elements including respective first, second, and third sun gears, respective first, second, and third carriers, and respective first, second, and third ring gears,
   first, second, and third clutches; and
   first, second, and third brakes;
   the second sun gear being disengageably connected with the input member through the first clutch, and being disengageably connected with a stationary member through the third brake;
   the second carrier being disengageably connected with the input member through the second clutch, and being disengageably connected with the stationary member through the second brake;
   the second ring gear being securely connected with the output member, and also being securely connected with another of the elements of the first and third planetary gear trains;
   the first sun gear being securely connected with the input member;
   the second carrier being disengageably connected with one of the elements of the first and third planetary gear trains through the third clutch, thereby the second planetary gear train being separable from the first and third planetary gear trains by disengaging the third clutch; and
   two of the elements of the first planetary gear train being securely coupled to two elements of the third planetary gear train to integrally join the first and third planetary gear trains.

2. A planetary gear transmission according to claim 1, wherein
   the second carrier is disengageably connected with the third sun gear through the third clutch;
   the first ring gear and the third carrier are securely connected with each other, and are disengageably connected with the stationary member through the first brake; and
   the first carrier and the third ring gear are securely connected with each other, and are securely connected with the output member.

3. A planetary gear transmission according to claim 1, wherein the second carrier is disengageably connected with the third sun gear and the first ring gear through the third clutch;

the first carrier and the third carrier are securely connected with each other, and are disengageably connected with the stationary member through the first brake; and the third ring gear is securely connected with the output member.

4. A planetary gear transmission according to claim 1, wherein the first and third planetary gear trains jointly serve as a Ravigneaux gear train;

the first planetary gear train comprising a small sun gear, a Ravigneaux carrier, and a Ravigneaux ring gear, the small sun gear being coupled to the input member;

the third planetary gear train comprising a large sun gear, the Ravigneaux carrier, and the Ravigneaux ring gear;

the second carrier is disengageably connected with the large sun gear through the third clutch;

the Ravigneaux carrier is disengageably connected with the stationary member through the first brake; and the Ravigneaux ring gear is securely connected with the output member.

5. A planetary gear transmission according to claim 1, wherein the first and third planetary gear trains jointly serve as a Ravigneaux gear train;

the first planetary gear train comprising a large sun gear, a Ravigneaux carrier, and a Ravigneaux ring gear, the large sun gear being coupled to the input member;

the third planetary gear train comprising a small sun gear, the Ravigneaux carrier, and the Ravigneaux ring gear;

the second carrier is disengageably connected with the small sun gear through the third clutch (K3);

the Ravigneaux ring gear is disengageably connected with the stationary member through the first brake; and the Ravigneaux carrier is securely connected with the output member.

6. A planetary gear transmission according to claim 1, wherein the second carrier is disengageably connected with the third sun gear through the third clutch;

the first ring gear and the third ring gear are securely connected with each other, and are disengageably connected with the stationary member through the first brake; and the first carrier and the third carrier are securely connected with each other, and are securely connected with the output member.

* * * * *